(12) United States Patent
Fulton et al.

(10) Patent No.: US 11,220,962 B1
(45) Date of Patent: Jan. 11, 2022

(54) METHODS AND SYSTEMS FOR A BOOSTED ENGINE

(71) Applicant: Ford Global Technologies, LLC, Dearborn, MI (US)

(72) Inventors: Brien Lloyd Fulton, Bloomfield Hills, MI (US); Chris Glugla, Macomb, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/953,028

(22) Filed: Nov. 19, 2020

(51) Int. Cl.
| | |
|---|---|
| *F02D 9/06* | (2006.01) |
| *F02D 13/02* | (2006.01) |
| *F02D 41/00* | (2006.01) |
| *F02D 41/18* | (2006.01) |

(52) U.S. Cl.
CPC ..... *F02D 13/0246* (2013.01); *F02D 41/0007* (2013.01); *F02D 41/18* (2013.01); *F02D 2200/0406* (2013.01); *F02D 2200/0411* (2013.01)

(58) Field of Classification Search
CPC ............ F02D 13/0207; F02D 13/0242; F02D 13/0246; F02D 41/1448; F02D 13/0257; F02D 13/0261; F02D 13/0284; F02D 2041/001
USPC .... 123/321, 323, 345, 347; 60/602.1, 605.1, 60/605.2, 612
See application file for complete search history.

(56) References Cited

U.S. PATENT DOCUMENTS

| | | |
|---|---|---|
| 2009/0198432 A1 | 8/2009 | Tabata et al. |
| 2016/0131089 A1 | 5/2016 | Lahti et al. |
| 2017/0051684 A1 | 2/2017 | Lahti et al. |

*Primary Examiner* — John Kwon
(74) *Attorney, Agent, or Firm* — Geoffrey Brumbaugh; McCoy Russell LLP

(57) ABSTRACT

Methods and systems are provided for improving turbocharger response in a boosted engine. In one example, a current turbocharger performance may be monitored, if meeting and operating in an optimum region for efficiency (e.g., on compressor and/or turbine maps), engine may be operated with a steady state exhaust valve opening (EVO) timing in an optimum position based on engine mapping (e.g., engine pumping work). Otherwise, the EVO timing may be advanced (opening earlier) to release more energy into the exhaust or retarded to release less, to move turbocharger to desired performance. By adjusting EVO timing to achieve desired turbocharger response and performance, faster response is achieved.

20 Claims, 9 Drawing Sheets

METHODS AND SYSTEMS FOR A BOOSTED ENGINE

FIELD

The present description relates generally to methods and systems for controlling a vehicle engine to improve turbocharger response

BACKGROUND/SUMMARY

Engine systems may be configured with a boosting device, such as a turbocharger, for providing a boosted air charge to the combustion chamber for improving emissions, fuel economy and power/torque outputs. Turbochargers include a turbine that is rotated by energy from an exhaust flow. The energy extracted by the turbine drives a compressor which delivers a boosted air charge to an engine intake. However, turbocharger response may be slow during some vehicle operating conditions, such as when the exhaust energy and the exhaust flow may be low, and/or when large amounts of exhaust gas recirculation (EGR) is required, which decreases available energy to the turbine to effect turbocharger response.

One example approach to address turbocharger response delay is shown by Lahti et al. in US 2016/0131089. Therein, a desired turbine vane position is determined using a feed forward approach using set point commands that indicate desired values for process parameters, the monitored engine parameters, the turbine intake flow correction factor, and the engine state estimates. During transient conditions, an air throttle is adjusted to control the fresh air flow entering the intake manifold to achieve the desired intake manifold diluent mass fraction. Further, an exhaust manifold pressure is maintained higher than necessary at low load to improve the transient response of the engine when load is applied.

However, the inventors herein have recognized potential issues with such systems. As one example, even with feed forward control, a response time for vane adjustment is greater. Further, adjusting air throttle when delta pressure is not sufficient to provide desired boost with the desired exhaust gas recirculation may cause the engine cylinders to have reduced combustion efficiency up to momentary misfire, severely impacting engine efficiency and fuel economy. On the other hand, maintaining higher exhaust manifold pressure than required at low load conditions results in efficiency losses due to increased pumping work (brake specific fuel consumption losses).

In one example, the issues described above may be addressed by a method for operating an engine, comprising: adjusting a steady state exhaust valve (EV) timing according to indicated mean effective pressure and/or pump mean effective pressure as determined via an in-cylinder pressure sensor (ICPS); adjusting a transient EV timing according to manifold absolute pressure (MAP) sensor output; and generating a desired EV timing according to the adjusted steady state EV timing and the adjusted transient EV timing. In this way, faster turbocharger response may be achieved while reducing pumping losses.

As one example, a base EV timing map may be updated (e.g., during one or more optimization conditions) to adjust a steady state EV timing for one or more engine operating conditions, including engine speed, engine load and boost, according to determined engine indicated and pumping work at the one or more engine operating conditions. For example, when turbocharger performance is met (e.g., turbocharger efficiency at a desired efficiency), the ICPS sensor may be used to assess engine efficiency by continuous calculation of cycle IMEP and PMEP, and the steady state EV timing may be adjusted to optimize the engine efficiency at that point. During transient conditions, a transient EV timing may be determined based on desired torque request and differences between current and desired response parameters (e.g., exhaust back pressure, manifold absolute pressure, turbine speed, mass air flow, etc.). A desired EV timing is then determined using the adjusted steady state timing as a basis, adding the transient timing with the engine operating with the desired EV timing. For example, during a tip-in, the desired EV timing may be an exhaust valve opening (EVO) timing that is advanced from a steady state EVO timing position to increase exhaust energy in response to the increased torque request during the tip-in to improve turbocharger response. The response from EVO timing changes is significantly faster than the VGT mechanism and boost changes based on the response of the whole system, and as such, a faster turbocharger response is achieved. Due to faster turbocharger response, the turbocharger operates much closer to or at the desired boost during the transient condition allowing the engine to get to the desired torque request faster, reducing operation time during the transient in in-efficient areas from the transient condition, this also maintains the delta pressure across the EGR valve required to provide the necessary EGR avoiding excessive valve opening and keeps the Air/Fuel (A/F) ratio higher during the maneuver reducing the incidence of misfires. It has the further added benefit of PM emissions reduction, reducing the incidence of DPF regeneration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
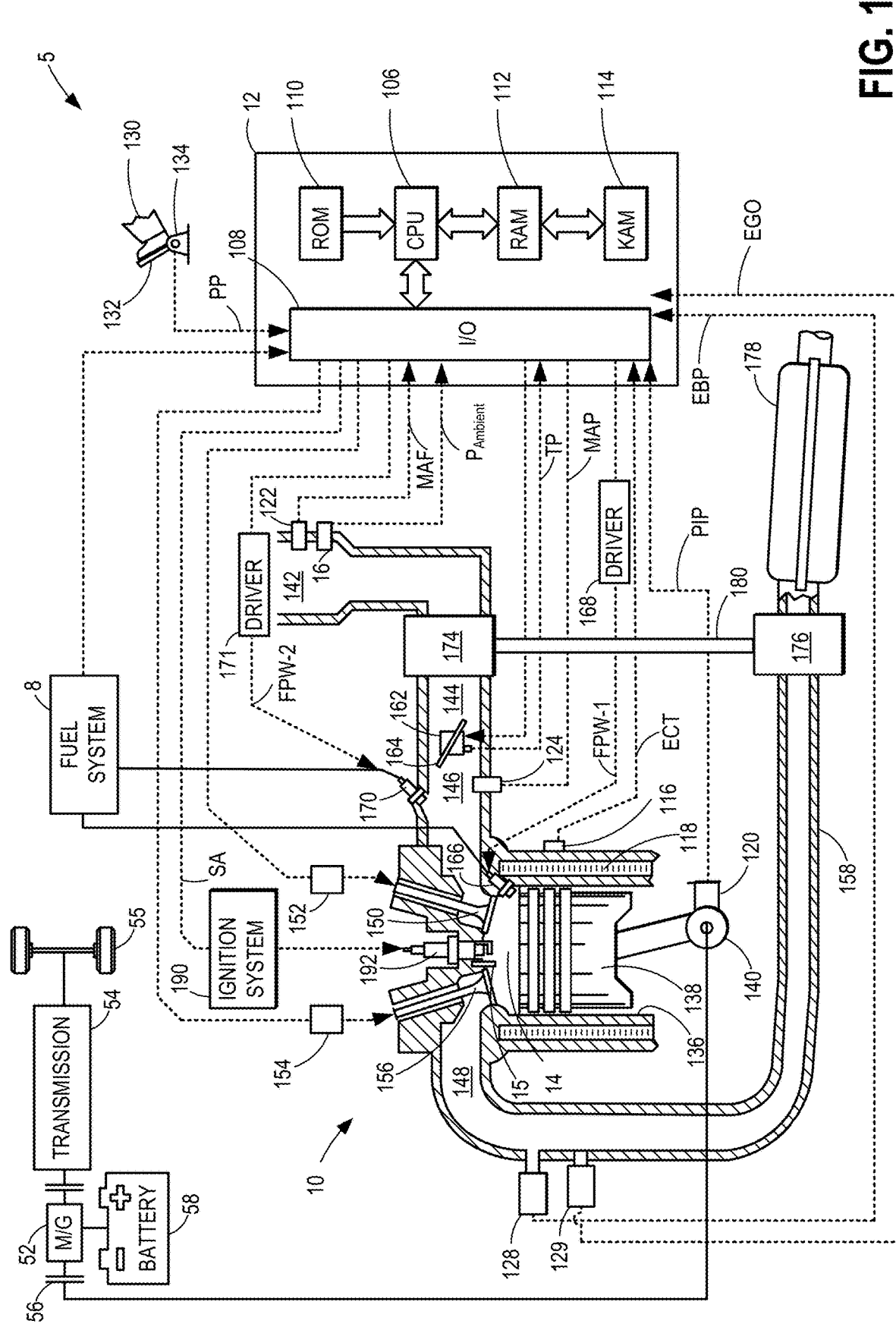
FIG. 1 shows an example embodiment of a boosted engine system.
Figure 6:
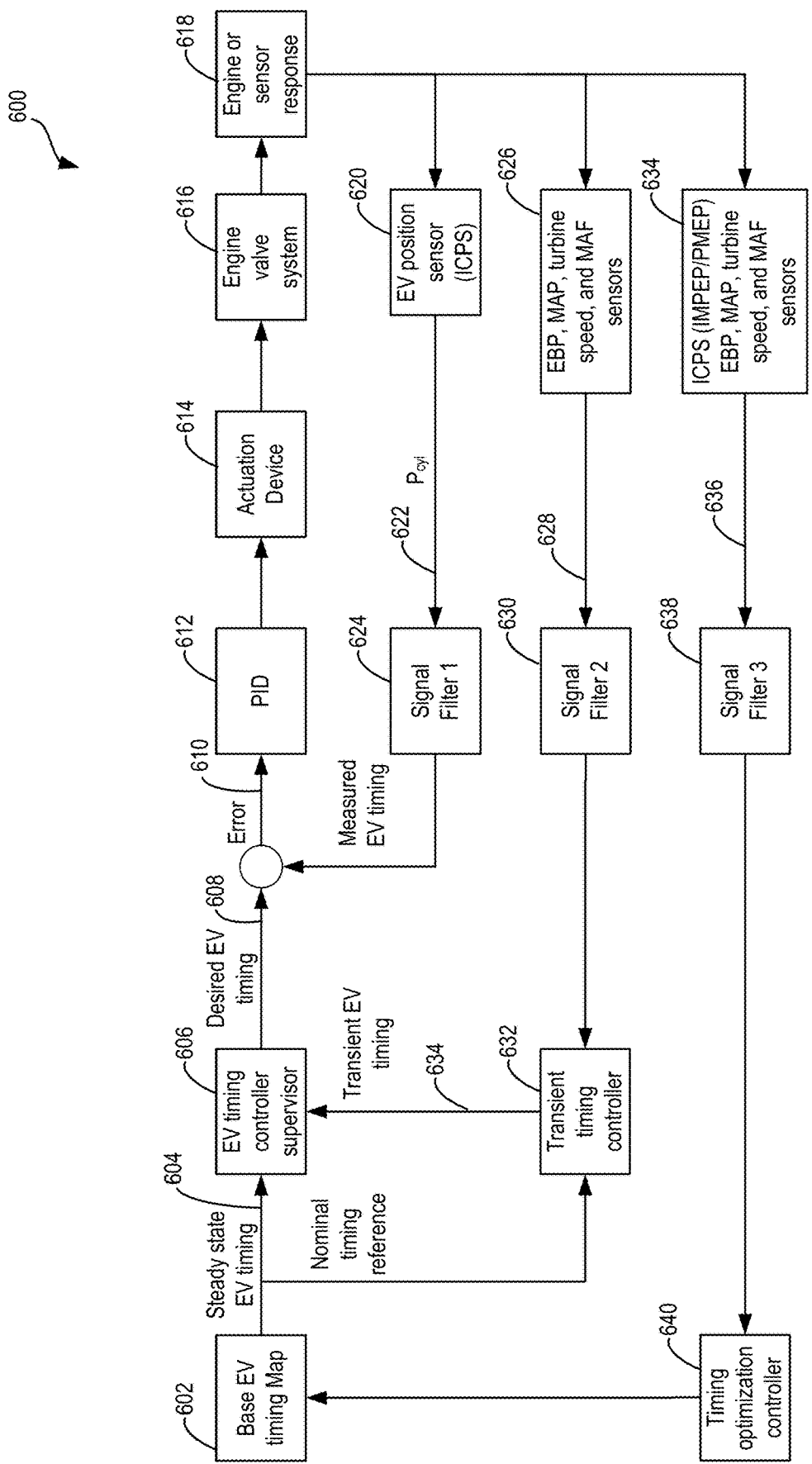
FIG. 6 shows a high level block diagram of an example EV timing control system.
Figure 7:
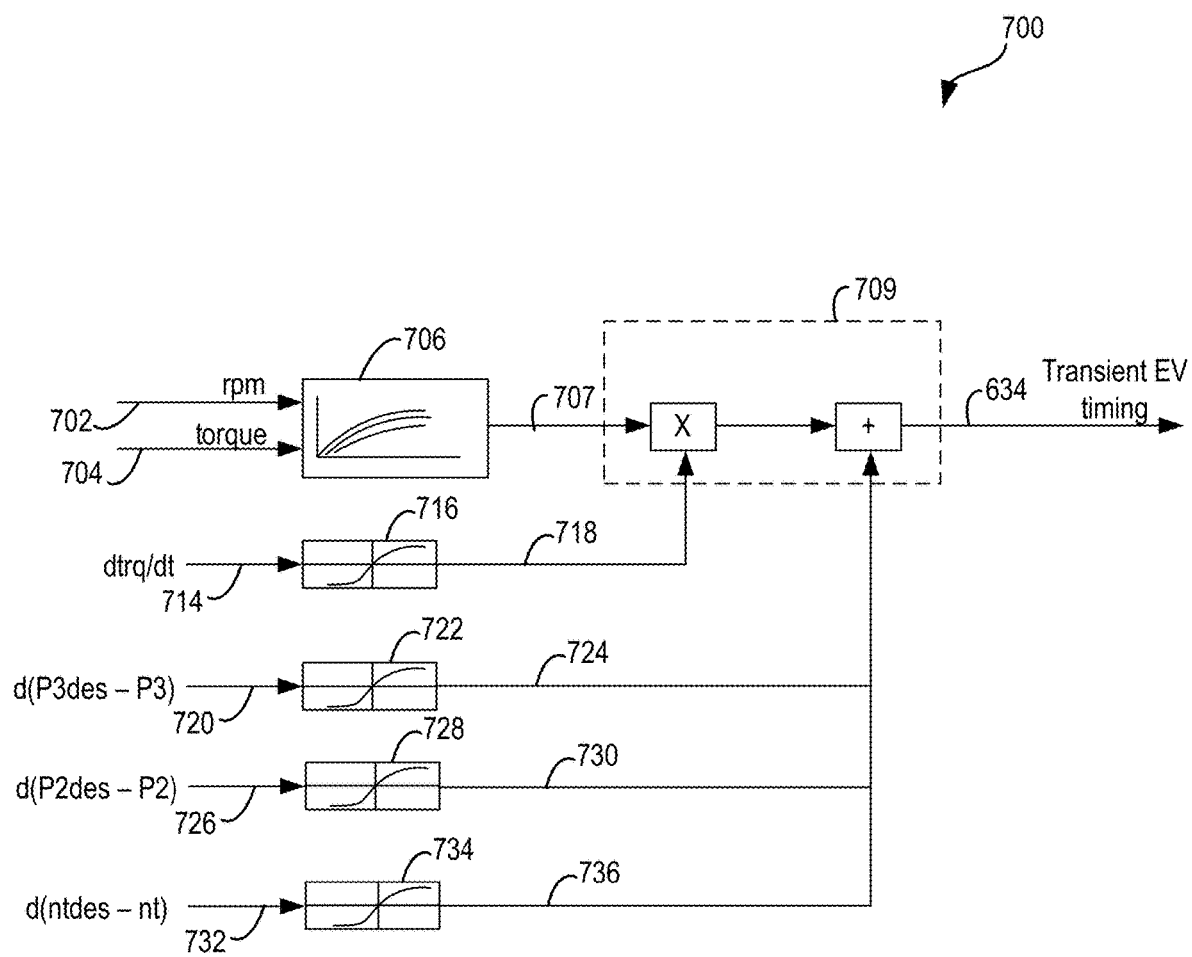
FIG. 7 shows a high level block diagram of an example control operation for determining a transient EV timing.
Figure 8:
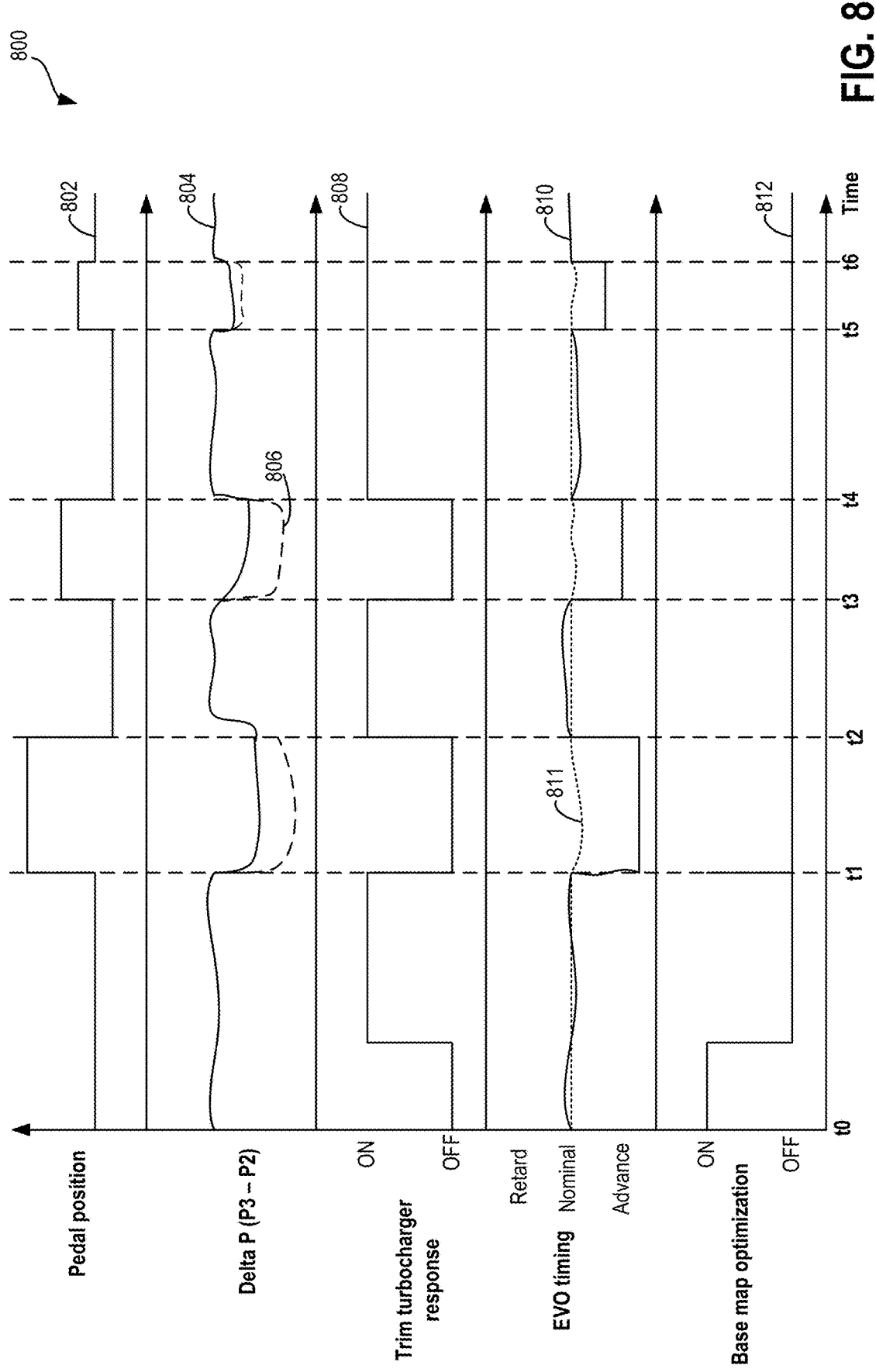
FIG. 8 shows an example sequence for adjusting EV timing during vehicle operation.

The following description relates to systems and methods for improving engine efficiency and turbocharger response with EVO timing during steady state and transient engine operating conditions in a boosted engine system such as the engine system shown at FIG. 1. A controller may be configured to perform a control routine, such as the routine of FIG. 2, to evaluate turbocharger and engine performance, and determine various EV timing adjustments for various vehicle operating conditions, which may include turbocharger and engine operating conditions. The controller may determine a steady state EV timing according to an optimized EV timing map and operate the engine with the optimized steady state EV timing when an engine is at a steady state condition and a turbocharger meets a desired performance, and otherwise, when not meeting the desired performance, the EV timing may be adjusted. For example, an EVO timing may be advanced to release more exhaust energy to a turbine of the turbocharger or retarded to reduce exhaust energy flowing to the turbine. An example routine performed by the controller for optimizing the base EV timing map is discussed at FIG. 5. During transient conditions, the controller may adjust a nominal timing (obtained according to the base EV timing map) to achieve a faster and more efficient turbocharger response, as discussed at FIG. 3. Further, the adjusted steady state EV timing and/or the adjusted transient EV timing may further adjusted to trim turbocharger response as elaborated at FIG. 4. FIG. 6 shows a block diagram illustrating an example EV timing control system that may be implemented to perform routines of FIG. 2-5. FIG. 7 shows an example block diagram of a subset of control system at FIG. 6, particularly, the transient response control. FIG. 8 describes an example EVO adjustment during various engine operation conditions. An in-cylinder pressure sensor (ICPS) may be used to provide feedback on an actual EV timing, particularly EVO timing, which may be used to adjust the actual EV timing to a desired EV timing. The ICPS may also provide pressure indications for determining an indicated mean effective pressure (IMEP) and/or a pump mean effective pressure (PMEP), which may be used during the optimization routine at FIG. 3. An example graph illustrating correlation between valve timings and in-cylinder pressure (as determined via an ICPS, for example) is described at FIG. 9

As discussed herein, Nominal exhaust valve (EV) timing is the optimum timing location for an engine at a particular operating point on the engine map as a function of speed and load.

Advanced exhaust valve timing is an adjusted EV timing that has moved the starting exhaust valve opening (EVO) position back towards top dead center (TDC) of the respective cylinder from the nominal EV timing location. This timing results in shorter expansion strokes from the optimum point that forces more energy into the exhaust.

Retarded exhaust valve timing is an adjusted EV timing that has moved the starting EVO position away from TDC of the respective cylinder from the nominal EV timing location. This timing results in longer expansion strokes from the optimum point that improves power/torque and bsfc until high pumping loses dominate, this reduces energy into the exhaust.

Referring now to FIG. 1, an example of a cylinder of internal combustion engine 10 included in an engine system 7 of vehicle 5 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of vehicle 5 via a transmission system. Further, a starter motor (not shown) may be coupled to crankshaft 140 via a flywheel to enable a starting operation of engine 10. In one example, an engine speed sensor (not shown) may be coupled to the crankshaft 140 to provide an indication of engine speed. For example, the engine speed sensor may produce a predetermined number of equally spaced pulses every revolution of the crankshaft 140.

Cylinder 14 may receive intake air via a series of intake air passages 142, 144, and 146. Intake air passage 146 may communicate with other cylinders of engine 10 in addition to cylinder 14. FIG. 1 shows engine 10 configured with a turbocharger 175 including a compressor 174 arranged between intake passages 142 and 144, and an exhaust turbine 176 arranged along an exhaust passage 148. Compressor 174 may be at least partially powered by exhaust turbine 176 via a shaft 180. A throttle 162 including a throttle plate 164 may be provided along an intake passage of the engine for varying a flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Upstream sensors 128 and 129 are shown coupled to exhaust passage 148 upstream of an underbody emissions treatment device 178 (and upstream of a first emissions treatment device 182, a second emissions treatment device 184, and a third emissions treatment device 188). Upstream sensor 128 may be an exhaust back pressure (EBP) sensor, for measuring an exhaust gas pressure in the exhaust passage 148 upstream of inlet to the turbine 176. Upstream sensor 129 may be selected from among various suitable sensors for providing an indication of exhaust gas air-fuel ratio such as a linear oxygen sensor or UEGO (universal or wide-range exhaust gas oxygen), a two-state oxygen sensor or EGO (as depicted), a HEGO (heated EGO), an HC, CO, or NOx sensor, for example.

Herein, when referring to components (e.g., sensors, emission treatment devices, etc.) disposed in the exhaust passage 148, "upstream" may refer to a position of one component being closer to the engine 10 than a position of another component; similarly, "downstream" may refer to a position of one component being farther from the engine 10 than a position of another component.

Underbody emissions treatment device 178 may be a three way catalyst (TWC), HC trap, NOx trap, GPF, DOC, DPF, SCR, LNT or other various other emissions treatment devices, or combinations thereof. In one example, the underbody emissions treatment device 178 is arranged in a far vehicle underbody. Comparatively, this location may be downstream of a close-coupled location, such as the location of first emissions treatment device 182. In this way, the first emissions treatment device 182 is arranged upstream of each of a second emissions treatment device 184, a third emissions treatment device 188, and the underbody emissions treatment device 178. Accordingly, the first emissions treatment device 182 may serve a protective role for other emissions treatment devices (e.g., 184, 188) disposed downstream from the first emissions treatment device 182 in the exhaust passage 148. That is, the first emissions treatment device 182 may extend a useful life of such downstream emissions treatment devices by providing one or more similar emissions treatment functionalities.

In one example, the first emissions treatment device 182 may be a DOC, TWC, GPF, a transition metal catalyst, or combinations thereof. For example, the first emissions treatment device 182 may be a GPF (such as the GPFs described below with reference to FIGS. 3A-4D) including a porous substrate or support material, such as a ceramic honeycomb wall flow monolith, where the porous substrate may include a plurality of passages or channels therein. In some examples, the ceramic honeycomb wall flow monolith may be configured to force exhaust gas through walls of the wall flow monolith via plugging of every other passage therein, such that emissions may be treated and/or captured. In other examples, the wall flow monolith may be formed from other materials, such as silicon carbide, aluminum titanate, or a metal or metal-alloy based material. In some examples, the plurality of passages may have a catalytic washcoat disposed thereon, wherein the catalytic washcoat includes one or more of Ni, Pt, Pd, and Rh. In one example, the porous substrate may be substantially free of any catalytic washcoat.

A second emissions treatment device 184 may be arranged in a location between the first emissions treatment device 182 and the third emissions treatment device 188. In this way, the second emissions treatment device 184 may be arranged downstream of the first emissions treatment device 182 and upstream of each of the third emissions treatment device 188 and the underbody emissions treatment device 178. In some examples, the second emissions treatment device 184 may be closer to the first emissions treatment device 182 and the third emissions treatment device 188 than the underbody emissions treatment device 178.

In one example, the second emissions treatment device 184 may be a TWC, DPF, GPF, a transition metal catalyst, or a combination thereof. For example, the second emissions treatment device 184 may be a GPF (such as the GPFs described below with reference to FIGS. 3A-4D) including a porous substrate or support material, such as a ceramic honeycomb wall flow monolith. Accordingly, the porous substrate may include a plurality of passages or channels therein. In some examples, the plurality of passages may have a catalytic washcoat disposed thereon, wherein the catalytic washcoat includes one or more of Ni, Pt, Pd, and Rh. In one example, the catalytic washcoat may include a single metal. For example, the catalytic washcoat may include Ni and no other metal.

A third emissions treatment device 188 may be arranged in a location between the second emissions treatment device 184 and the underbody emissions treatment device 178. In this way, the third emissions treatment device 188 may be arranged downstream of each of the first emissions treatment device 182 and the second emissions treatment device 184 and upstream of the underbody emissions treatment device 178. In some examples, the third emissions treatment device 188 may be closer to the first emissions treatment device 182 and the second emissions treatment device 184 than the underbody emissions treatment device 178.

In one example, the third emissions treatment device 188 may be a TWC, SCR, LNT, GPF, a transition metal catalyst, or a combination thereof. For example, the third emissions treatment device 188 may be a GPF (such as the GPFs described below with reference to FIGS. 3A-4D) including a porous substrate or support material, such as a ceramic honeycomb wall flow monolith. Accordingly, the porous substrate may include a plurality of passages or channels therein. In some examples, the plurality of passages may have a catalytic washcoat disposed thereon, wherein the catalytic washcoat includes one or more of Ni, Pt, Pd, and Rh.

It will be appreciated that while the depicted example shows four distinct emissions treatment devices (e.g., 182, 184, 188, and 178) coupled to the exhaust passage 148, in other examples, a larger or smaller number of emissions treatment devices may be present. Further, multiple copies of a given emissions treatment device may be present in the depicted order, or in a different order. As to the depicted order, functions of component catalysts may be dependent upon one another to effectively treat exhaust emissions.

A difference between the close-coupled location and the far vehicle underbody location may include a distance from the engine, wherein the close-coupled location is closer to the engine than the far vehicle underbody location. That is to say, components in the close-coupled location are upstream of components in the far vehicle underbody location. Further, exhaust gas temperatures experienced by components in the close-coupled location may be higher than exhaust gas temperatures experienced by components in the far vehicle underbody position.

A first sensor 183 may be arranged between the first emissions treatment device 182 and the second emissions treatment device 184. Further, a second sensor 185 and a third sensor 187 may be arranged between the second emissions treatment device 184 and the third emissions treatment device 188. Further, a fourth sensor 189 may be arranged between the third emissions treatment device 188 and the underbody emissions treatment device 178. Sensors 183, 185, 187, and 189 may independently include one or more of a temperature sensor, an exhaust gas sensor (e.g., an HC, CO, or NOx sensor), an oxygen sensor, a pressure sensor, and the like. In some examples, feedback from the sensors 128, 183, 185, 187, and/or 189 may be used by the controller 12 to infer degradation of one or more of the emissions treatment devices and notify the operator of any inferred degradation.

It will be appreciated that while the depicted example shows four distinct sensors 183, 185, 187, and 189 coupled to the exhaust passage 148, in other examples, a larger or smaller number of sensors may be present. Further, multiple copies of a given sensor may be present in the depicted order, or in a different order.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). In some examples, an in-cylinder pressure sensor (ICPS) 15 may be used to provide feedback regarding intake and/or exhaust valve positions to the controller 12, as further discussed below. The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock or in a diesel application where the compression ratio can go to ranges of 18:1 or higher.

In some examples, each cylinder of engine 10 may include a spark plug 192 for initiating combustion. Ignition system 190 may provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines. Diesel engines may have a cold start assist device like a glow plug installed in the combustion chamber to create a hot spot next to the fuel spray plume to aid ignition during cold start an operation.

Figure 9:
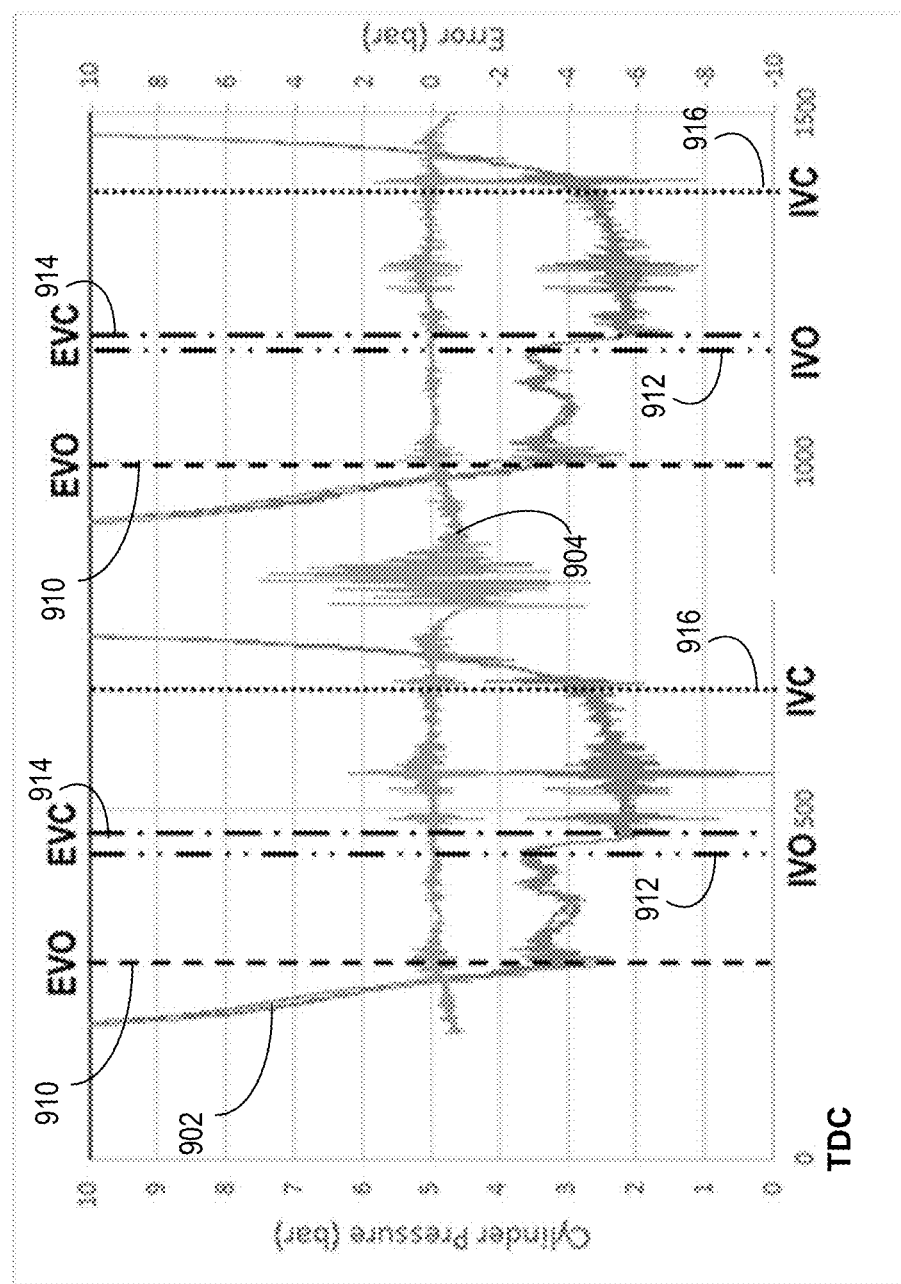
FIG. 9 shows an example graph for determining EV timing via an in-cylinder pressure sensor.

In some examples, each cylinder of engine 10 may include the in-cylinder pressure sensor (ICPS) 15 for indicating an in-cylinder pressure which may be utilized for determining an intake and/or exhaust valve opening and/or closing timing as a function of crank angle, as discussed at FIG. 9. The pressure indications from the ICPS may also be utilized to determine IMEP and PMEP for evaluating a pumping efficiency of the engine 10. Turning to FIG. 9, it shows an example graph 900 illustrating intake and exhaust valve opening and closing events according to cylinder pressure indications from an in-cylinder pressure sensor, such as ICPS 15 at FIG. 1. The graph 900 is plotted with crank angle at X-axis, and cylinder pressure (in bars) at Y-axis. In-cylinder pressure is indicated by plot 902 and signal noise of pressure signal is indicated by plot 904. Vertical lines indicate intake and exhaust valve events (opening and closing). In particular, vertical lines 910 (dashed lines) represent exhaust valve opening (EVO) events, vertical lines 912 (dash-dot-dot-dash lines) indicates intake valve opening (IVO) events, vertical lines 914 (dash-dot-dash lines) represents exhaust valve closing (EVC) events, and vertical lines 916 (dotted lines) indicate intake valve closing (IVO) events. The graph 900 shows the valve events 910, 912, 914, and 918 overlaid on an in-cylinder pressure sensor measured cylinder pressure trace for subsequent engine cycles. Respective opening and closing timing indications of valve movements may be determined from the pressure trace 902 and signal noise 904 of the pressure trace. This allows the in-cylinder pressure signal to be used as feedback signal for EV timing control, as shown in block diagram at FIG. 6 below.

In this way, using an in-cylinder pressure sensor, an actual exhaust valve opening timing may be determined, which may be used to determine an error to desired EV timing, for real-time adjustment of EV timing. Thus, the ICPS may be used to determine valve events in place of an EVO cam position sensor, which provides cost saving benefits. Further, in some examples, the ICPS may be used to adjust the EVO position sensor to provide a more accurate EVO timing using the actual position on the crank shaft. In some other examples, ICPS may be used to monitor EVO timing separate from the EVO position sensor for OBD and diagnostics. Furthermore, if an EVO timing error is determined (e.g., according to indications from ICPS and EVO position sensor), the EVO timing may adjusted to compensate for the EVO timing error. For example, when used with the EVO position sensor, an offset value can be learned from the ICPS sensor when the EVO event occurs and added to the EVO position sensor.

Returning to FIG. 1, in some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating engine 10 with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Herein, operation of the intake valve 150 may be described in greater detail. For example, the intake valve 150 may be moved from a fully open position to a fully closed position, or to any position therebetween. For all conditions being equal (e.g., throttle position, vehicle speed, pressure, etc.), the fully open position allows more air from the intake passage 146 to enter the cylinder 14 than any other position of the intake valve 150. Conversely, the fully closed position may prevent or allow the least amount of air from the intake passage 146 to enter the cylinder 14 than any other position of the intake valve 150. Thus, the positions between the fully open and fully closed position may allow varying amounts of air to flow between the intake passage 146 and the cylinder 14. In one example, moving the intake valve 150 to a more open position allows more air to flow from the intake passage 146 to the cylinder 14 than its initial position.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations, etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization may include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; ambient pressure from ambient pressure sensor 16, in-cylinder pressure from ICPS 15, exhaust back pressure signal (EBP) from EBP sensor 128, turbine speed from a turbine speed sensor (not shown) coupled to turbine shaft 180, and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Signal from the MAP sensor 124 may be used to determine a compressor outlet pressure and the signal from the ambient pressure sensor 16 may be used to determine a compressor inlet pressure. Further, signals from MAP sensor 124 and EBP sensor 128 may be utilized to determine a delta pressure across the engine 10. Controller 12 may infer an engine temperature based on an engine coolant temperature.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all the various components described and depicted by FIG. 1 with reference to cylinder 14.

The controller 12 receives signals from the various sensors of FIG. 1 and then may notify the vehicle operator 130 of potential issues and/or employ the various actuators of FIG. 1 to adjust engine operation based on the received signals and instructions stored on a memory of the controller. That is, the non-transitory read-only memory chip 110 may be programmed with non-transitory, computer readable data representing instructions executable by the microprocessor unit 106 for performing the various diagnostic routines. Accordingly, an exemplary diagnostic routine is provided by the method described in detail below with reference to FIG. 5.

Specifically, in examples where at least one of the emissions treatment devices (e.g., 178, 182, 184, and 188) is a GPF, the controller 12 may be operable to alter at least one of a plurality of engine operating conditions or parameters so as to generate an oxygen-rich environment to promote passive regeneration of the GPF. For instance, one or more fuel injectors (e.g., 166, 170) may be deactivated during vehicle coasting in a transient fuel shut off (TFSO) event. Further, at least one of the plurality of engine operating conditions may be altered so as to actively regenerate the GPF. For instance, fuel injection by one or more fuel injectors may be increased, ignition (spark) may be delayed, or fuel injection timing may be delayed. In some examples, the controller 12 may further be operable to alter one or more of the plurality of engine operating conditions responsive to the GPF reaching a threshold state of degradation, such as adjusting one or more fuel injectors, the adjusting throttle 162, etc. as based upon input from one or more of the sensors (e.g., 128, 183, 185, 187, 189).

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, the controller 12 receives signals from at least MAP sensor 124, EBP sensor 128, turbine speed sensor, engine speed sensor, ICPS 15, ambient pressure sensor 16, and input device 132 to determine a desired EV timing that is adjusted from a nominal EV timing (determined from a base EV timing map stored in a non-transitory memory of the controller 12) during various engine and turbocharger operating conditions to improve turbocharger response. Further the controller 12 employs an exhaust valve actuator 154 to adjust one or more of a position, a duration, and a timing of opening and/or closing, based on the received signals and instructions stored in non-transitory memory of the controller 12. For example, adjusting EV timing to a desired EV timing may include controlling the exhaust valve actuator 154 to adjust an exhaust valve opening timing or closing timing. Further, adjusting EVO timing to a desired EVO timing may include controlling the exhaust valve actuator 154 to adjust an exhaust valve opening timing.

Figure 2:
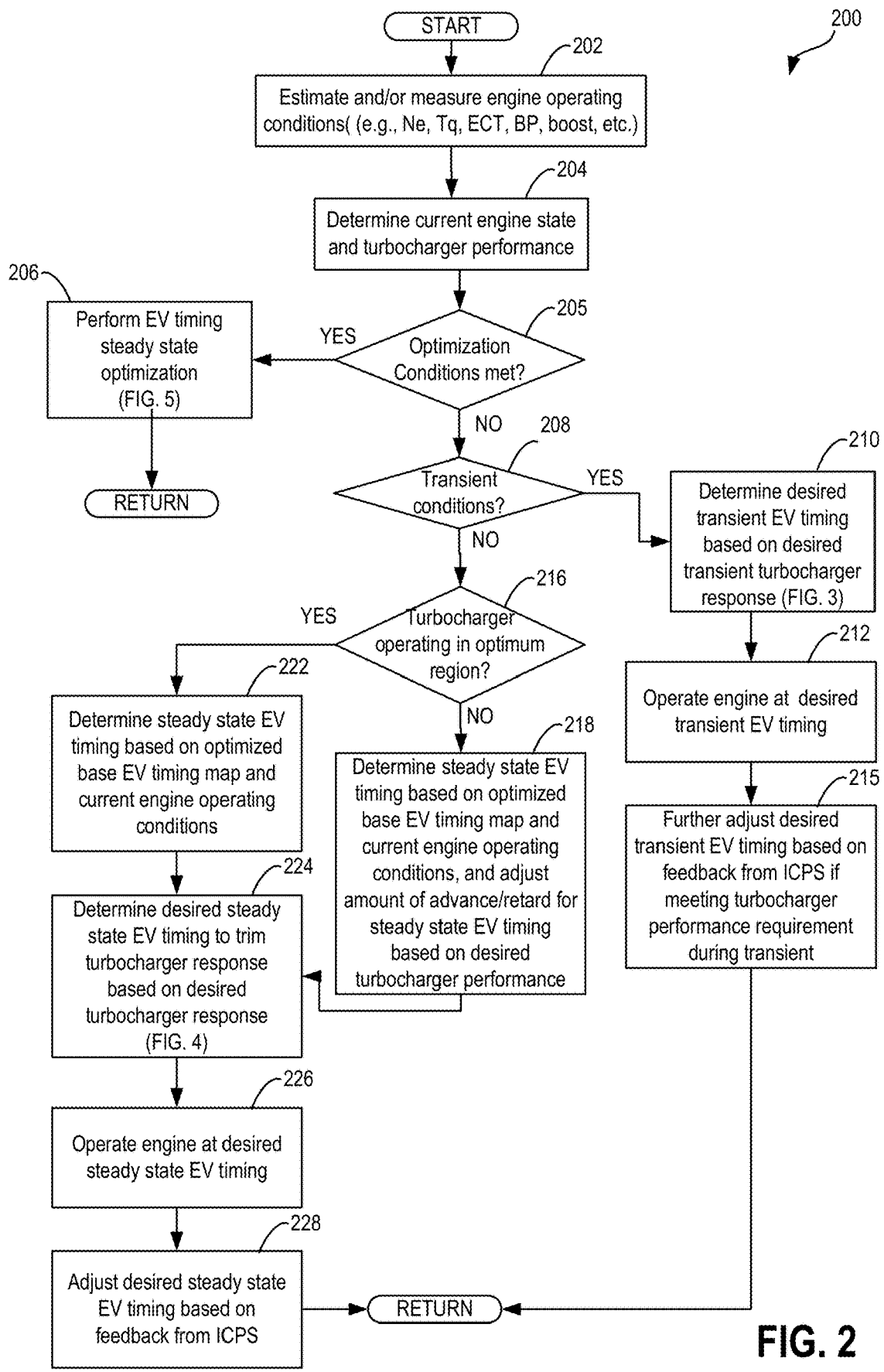
FIG. 2 shows a high level flow chart illustrating a routine that may be implemented for adjusting an exhaust valve (EV) timing to improve turbocharger response.

Turning to FIG. 2, it shows a flowchart illustrating a high-level method 200 for adjusting engine operation based on turbocharger performance. The method 200 may be performed during vehicle operation to provide improved turbocharger response as well as to provide improved engine operation. Instructions for carrying out method 200 and the rest of the methods included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method 200 includes estimating and/or measuring engine operating conditions. For example, the engine operating conditions may include turbocharger operating conditions. Thus, the engine operating conditions may include one or more of the following: exhaust back pressure (EBP; e.g., exhaust manifold pressure), manifold absolute pressure (MAP), boost pressure, turbine speed, mass air flow (MAF), turbine inlet and outlet temperatures, compressor inlet and outlet temperatures, indicated mean effective pressure (IMEP), pumping mean effective pressure (PMEP) engine torque, engine speed, engine load, accelerator pedal position, etc., among other suitable conditions.

Next, at 204, the method 200 includes determining the current engine state and turbocharger performance. The current turbocharger performance may be assessed by determining one or more of a compressor efficiency and a turbine efficiency using input from various sensors of the engine system. For example, the compressor efficiency may be determined according to compressor inlet pressure (e.g., determined via an ambient pressure sensor), a compressor outlet pressure (e.g., determined via a manifold absolute pressure sensor (MAP sensor), a turbine speed (e.g., determined via a turbine speed sensor) and mass air flow (e.g., determined via a MAF sensor). The current engine state may include determining if the engine is operating in one of a steady state, very steady state, quasi steady state, or transient state. The current engine state may be determined according to one or more of a current engine speed, a current engine load, requested engine torque, and brake specific fuel consumption (BSFC), for example. The current engine state and/or the turbocharger performance may be used to evaluate if an optimization routine may be performed, or determine EV timing adjustments that may be performed (e.g., steady state EV timing, transient EV timing, etc.), as further discussed below.

At 205, method 200 includes determining if optimization conditions are met. Determining optimization conditions includes determining if the engine is at a steady or a quasi steady state operation mode as well as other states including a check on turbocharger performance. The optimization conditions may include steady-state operating conditions during which exhaust valve (EV) timing optimization may be performed. In one example, the steady-state operating conditions may include engine speed within a threshold speed range, and engine load within a load range. Steady state operating conditions including when a condition used to determine whether steady state operation is present changes less than 5% in a given duration, such a given time duration such as 3 seconds. As a non-liming example, steady state operating conditions when optimization may be performed (that is, optimization conditions) may include a medium engine speed and a high load condition as the conditions used to determine steady state. Additionally or alternatively, steady state operating conditions may include engine operating points when BSFC is below a threshold BSFC and not changing by more than a threshold for a given duration. In one example, the controller may evaluate if the current engine operation (e.g., according to current engine speed and torque estimated as a function of mean effective pressure) is within the desired BSFC threshold, and not changing by more than a threshold for a given duration. Thus, in one example, optimization conditions may be confirmed when the engine is operating within the respective steady-state speed and load threshold ranges and/or when the BFSC is below the threshold BSFC. In some examples, the optimization conditions may be confirmed when the engine is operating in the steady state operating conditions (e.g., speed, load, and/or BSFC) within 10% for a threshold duration. In another example, in addition to evaluating the engine state as discussed above (e.g., steady state), it may be determined if turbocharger performance is within a desired region for efficiency in one or more of compressor and turbine maps. The desired region may be the same as or in a higher efficiency region as discussed below with respect to step 216.

If the optimization conditions are met, the answer at 205 is YES, and the method 200 proceeds to 206. At 206, the method 200 includes performing an optimization routine to optimize EV timing in order to update EV timings in a base EV timing map. Details of performing EV timing optimization is described below at FIG. 5 and FIG. 6. If the optimization conditions are not met, the answer at 205 is NO, and the method 200 proceeds to 208.

At 208, the method 200 includes determining if a transient condition is detected. The transient condition may include a sudden increase in torque demand (e.g., due to an operator pedal tip-in, which may be determined based on a change in the accelerator pedal position). If the transient condition is not detected, the answer at 208 is NO, and the method 200 proceeds to 214. At 214, the method 200 includes determining current turbocharger performance. The current turbocharger performance may be assessed by determining one or more of a compressor efficiency and a turbine efficiency using input from various sensors of the engine system. For example, the compressor efficiency may be determined according to compressor inlet pressure (e.g., determined via an ambient pressure sensor), a compressor outlet pressure (e.g., determined via a manifold absolute pressure sensor (MAP sensor), a turbine speed (e.g., determined via a turbine speed sensor) and mass air flow (e.g., determined via a MAF sensor).

Next, at 216, the method 200 includes evaluating if the turbocharger is operating within a desired region for efficiency in one or more of compressor and turbine maps. In one example, turbocharger performance may be evaluated according to whether the turbocharger is meeting a desired boost requirement in respective desired efficiency regions of the compressor and/or turbine maps. If the answer at 216 is YES, the method 200 proceeds to 222.

Next, at 222, the method 200 includes obtaining a steady state EV timing according to an optimized base EV timing map and current engine operating parameters. For example, the optimized base EV timing map may include nominal EV timings for various engine operating conditions. Thus, for a current engine speed and engine load, a current steady state EV timing may be obtained from the base EV timing map that is updated and optimized. Optimization of the base EV timing map is discussed at FIG. 5. Briefly, during optimization, nominal EV timings on the base EV timing map may be adjusted according to indicated mean effective pressure (IMEP) and/or pump mean effective pressure (PMEP) as determined via an in-cylinder pressure sensor (ICPS).

Next, at 224, the method 200 includes adjusting the steady state EV timing (obtained at 222) to obtain a desired EV timing based on desired engine and turbocharger response. For example, the steady state timing may be adjusted to obtain the desired EV timing in order to trim the turbocharger response, and is discussed with respect to FIG. 4.

Upon obtaining the desired steady state EV timing, the method 200 proceeds to 226. At 226, the method 200 includes operating the engine with the desired steady state EV timing. For example, an EV actuator may operate the exhaust valve(s) on a number of cylinders (which may be determined to obtain the desired EV timing as discussed at FIG. 4 below) at the desired steady state EV timing.

Next, at 228, the method 200 includes adjusting the desired steady state EV timing based on feedback regarding EVO timing from the ICPS. For example, ICPS may be used to monitor EV timing, and using the feedback from the ICPS regarding a current EVO timing, an error between the current and the desired EVO timings may be determined by the controller, and the EVO timing may be adjusted to the desired EVO timing according to the error signal.

In one embodiment, the desired steady state EV timing may be further adjusted to obtain a desired or optimized engine efficiency when the turbocharger performance is meeting its performance requirements (e.g., turbocharger meeting desired boost within desired efficiency region). Further, a comparison with previous efficiencies when looking for an optimum may be performed. For example, if the current engine efficiency is deviating by a threshold deviation from the desired or optimized engine efficiency or previous cycle efficiency, based on real-time feedback from the ICPS, IMEP and PMEP may be calculated while continuously adjusting EV timing (e.g., exhaust valve opening (EVO) timing) on the number of cylinders to achieve the desired engine efficiency. In this way, the EV timing is adjusted for improving turbocharger as well as engine efficiency.

Returning to 216, if the turbocharger is not operating in the optimum region, the answer at 216 is NO, and the method 200 proceeds to 218. At 218, the method 200 includes adjusting a steady state EV timing based on a desired turbocharger performance. The steady state EV timing may be determined using the optimized base EV timing map and current engine operating condition as discussed with respect to step 222. The steady state EV timing may then be adjusted based on achieving the desired turbocharger performance. An amount of adjustment of EV timing may be within a threshold range such that it enables other issues that cause the turbocharger to perform poorly may be identified by suitable diagnostics, and not masked by EV timing adjustment. That is, EV timing adjustment may be within a specified EV timing range, such that if there are other issues causing the turbocharger to perform poorly that for EVO timing to adversely affect engine efficiency to a point were it degrades significantly, then EV timing adjustment is stopped. By specifying an EV timing range within with adjustment of EV timing is performed, other issues such as exhaust or boost leaks beyond a threshold leak may not be masked, and may be diagnosed based on degraded turbocharger performance.

In one example, the desired turbocharger performance may be determined according to a desired boost pressure and the compressor operating at a desired efficiency while delivering the desired boost pressure. Additionally or alternatively, a delta pressure across the engine that is required to provide a desired EGR for the engine operating conditions may be used to determine the adjustment for the steady state EV timing. The adjustment in the steady state EV timing may be a degree of advancement or a degree of retardation of an exhaust valve opening (EVO) timing from a nominal (that is, optimum) opening timing. If the turbocharger is not meeting its performance requirement and requires more exhaust energy to meet the desired boost pressure, then an exhaust valve opening (EVO) timing may be advanced. By advancing the EVO timing, more exhaust energy is released to the turbine inlet, and consequently, an amount of boost pressure delivered by the compressor may be increased. Further, by adjusting a degree of EVO timing advance, an increase in boost pressure may be adjusted. Thus, the degree of EVO timing advance is determined according to a desired increase in boost pressure. For example, as the desired increase in boost pressure increases, the EVO timing advance is increased (e.g., closer to TDC). In one example, a current boost pressure may be determined via the MAP sensor, and a desired boost pressure may be determined according to a torque request (e.g., the torque request according to an accelerator pedal position). Further, if the turbocharger is exceeding the desired boost pressure, then the exhaust valve opening may be retarded to release less exhaust energy to the turbine inlet, and thereby reduce the current boost pressure to the desired boost pressure. In this way, by retarding EVO timing, exhaust energy delivered to the turbine inlet is reduced, which in turn reduces the amount of boost pressure delivered by the compressor. A degree of retard of EVO timing may be determined according to a desired reduction in the current boost pressure. As a result, the current boost pressure may be reduced to the desired boost pressure. In some examples, additionally the adjustment of the steady state EV timing may take in account a desired efficiency of the turbocharger while meeting the desired boost pressure within a reasonable engine efficiency window.

By adjusting the EV timing, particularly the EVO timing, a faster turbocharger response for meeting the desired boost pressure and/or turbocharger efficiency may be achieved. Upon determining the adjustment for the steady state EV timing, the method 200 then proceeds to 224 to trim the turbocharger response as discussed above. Prior to trimming the turbocharger response, the adjustment in EV timing is determined for all cylinders, and in some examples, all cylinders may be operated with the adjusted EV timing in order to achieve a faster turbocharger response. In some other examples, a number of cylinders that may be operated with the EV timing may be reduced to further adjust turbocharger response in a finer way than could be achieved with a timing adjustment on all cylinders, as discussed at FIG. 4.

Returning to 208, if transient conditions are detected, the answer at 208 is YES, and the method 200 proceeds to 210. At 210, the method 200 includes determining a desired transient EV timing according to a desired turbocharger response during the transient condition. Details of determining the transient EV timing is described at FIG. 3.

Upon determining the desired transient EV timing, the method 200 proceeds to 212. At 212, the method 200 includes operating the engine with the desired transient EV timing. For example, the controller may output the desired EV timing signal to an EV actuator, and the EV actuator may operate the exhaust valve(s) at the desired transient EV timing. As discussed above with respect to steady state EV timing, the desired transient EV timing may be further adjusted to trim turbocharger response during transient conditions. Trimming turbocharger response is discussed with respect to FIG. 4.

Next, at 215, the method 200 includes further adjusting the desired transient EV timing based on feedback from the ICPS, as discussed above with respect to 228.

In this way, EV timing may be adjusted during various engine operating conditions to improve turbocharger response which may not be directionally correct for optimized engine efficiency but improves total engine efficiency for the entire maneuver. For example, as the nominal EV timing (from the base EV map) is optimized over the life time of the vehicle, for example to account for component aging, fouling etc., the nominal EV timing is optimal for engine efficiency, and further by adjusting the nominal EV timing according to desired boost and/or turbocharger performance during various engine operating conditions, including steady state and transient conditions, turbocharger response is improved (e.g., increase in turbocharger efficiency and reduction in turbocharger response time to requested torque increase) while achieving increased engine efficiency.

In one example, the method 200 and the other methods described herein may be applied to a variable geometry turbocharger. In such examples, EVO timing adjustment may be performed in conjunction with VGT vane position adjustment, particularly during transient operating conditions.

Figure 3:
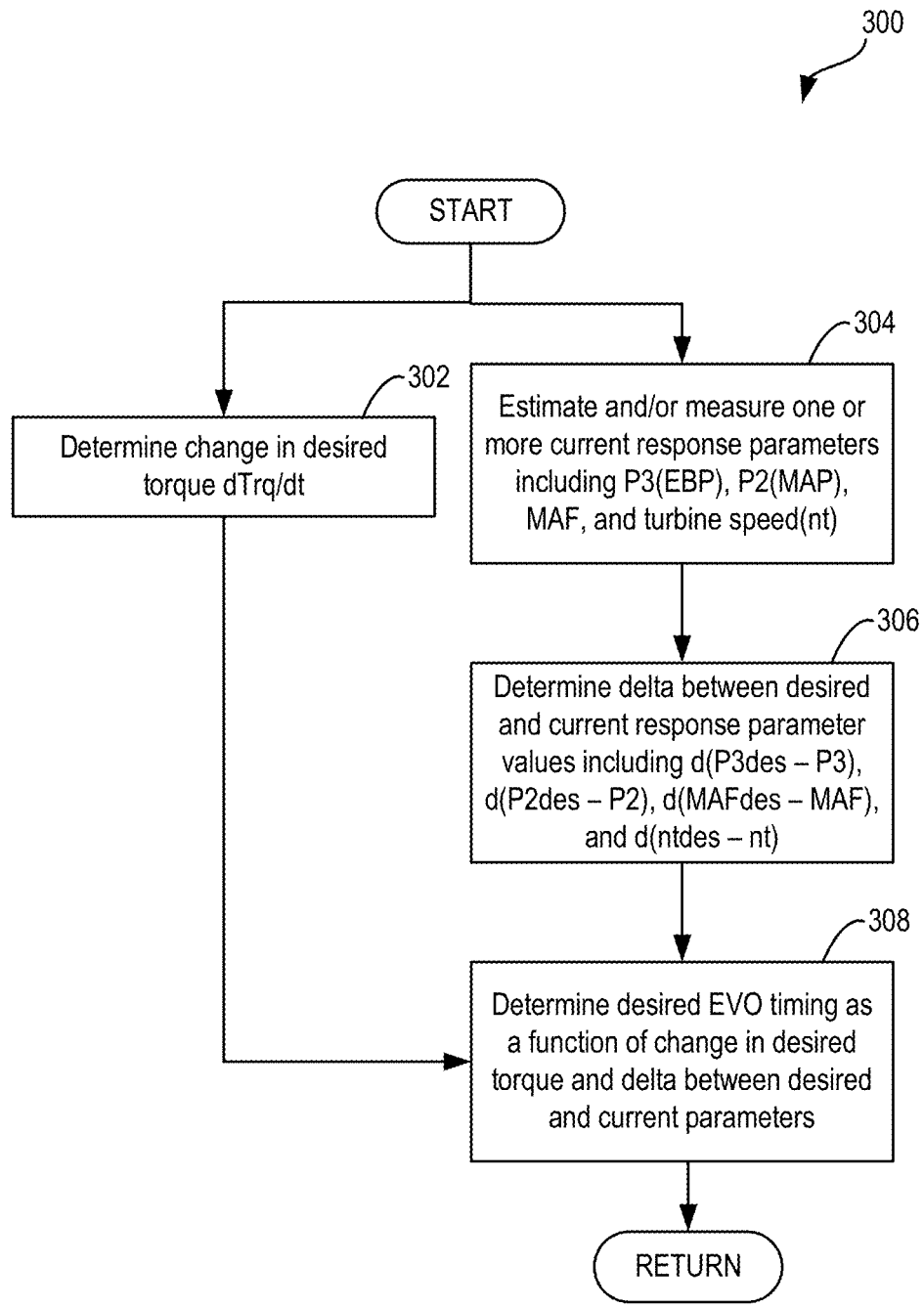
FIG. 3 shows a high level flow chart illustrating a routine that may be implemented for determining a transient EV timing to improve turbocharger response during a transient condition.

Next, FIG. 3 shows a high-level flowchart illustrating an example method 300 for improving turbocharger response during transient operating conditions. In particular, method 300 may be implemented to determine a transient EV timing during transient operating conditions to improve turbocharger response. Instructions for carrying out method 300 may be executed by a controller, such as controller 12 of FIG. 1 above or transient timing controller 632 at FIG. 6 below, based on instructions stored on a memory of the controller and in conjunction with signals received from sensors of the engine system, such as the sensors described above with reference to FIG. 1.

At 302, the method 300 includes determining a change in desired torque in response to the transient condition. For example, during a tip-in, the desired engine torque may increase, and the change in engine torque over time may be a rate of increase in engine torque over time. The change in engine torque over time may be represented by d (Trq)/dt.

At 304, the method 300 includes estimating and/or measuring one or more turbocharger current transient response parameters. The current transient response parameters may include exhaust back pressure (P3), which may be measured by an exhaust back pressure sensor (e.g., EBP sensor 128); manifold absolute pressure (P2), which may be measured by a manifold absolute pressure sensor (e.g., MAP sensor 124); a turbine speed (nt), which may be determined based on indication from a turbine speed sensor; and a mass air flow (MAF), which may be measured by a MAF sensor (e.g., MAF sensor 122).

Next, at 306, the method 300 includes determining a difference between desired and current values for transient response parameters. Accordingly, an exhaust back pressure difference d(P3des−P3) between desired exhaust back pressure (P3des) and current exhaust back pressure (P3); a manifold absolute pressure difference d(P2des−P2) between desired manifold absolute pressure (P2des) and current manifold absolute pressure (P2); a mass air flow difference d(MAFdes−MAF) between desired mass air flow (MAFdes) and current mass air flow (MAF); and a turbine speed difference d(ntdes−nt) between desired turbine speed (ntdes) and current turbine speed (nt) may be determined.

Next, at 308, the method 300 includes determining a desired transient exhaust valve timing as a function of change in desired torque and difference between desired and current transient response parameters. For example, a nominal EV timing for current engine operating conditions, including speed and load, may be used as a base timing for adjustment during transient conditions. The nominal EV timing may be determined using the base EV timing map, which includes updated EV timings for various engine operating speeds and loads. Upon obtaining the nominal EV timing, a transient EV timing may be determined, the transient EV timing adjusted from the nominal EV timing to achieve faster and improved turbocharger response during the transient condition. In one example, a transient exhaust valve opening (EVO) timing may be determined, wherein an amount of advance or retard of a nominal EVO timing may be proportional to a function of the change in desired engine torque and the errors to the desired transient response parameters (e.g., P3, P2, nt, and/or MAF). In one example, during a transient operation that includes a tip-in, the transient EVO timing may be advanced as a function of change in desired torque increase and one or more errors in transient response parameters (e.g., P3, P2, nt, and/or MAF) to increase exhaust heat and thereby, to improve initial turbocharger response to tip-in.

In this way, during transient conditions, the desired transient EV timing may be determined based on feedback from sensors such as EBP, MAP, MAF, and turbine speed sensors, and change in desired torque to improve turbocharger response during the transient condition.

In one example, the transient EVO timing is the desired EVO timing with which the engine is operated to achieve the desired turbocharger response. That is, all the cylinders of the engine ae operated with the desired EVO timing.

In another example, turbocharger response may be trimmed by determining a number of cylinders on which the transient EVO timing determined at 308 may be utilized. For example, during the tip-in, instead of advancing the EVO timings on all cylinders, a number of cylinders less than a total number of cylinders may operate with advanced EV timing while a remaining number of cylinders may operate with nominal EV timing. Further, additional adjustments to the advanced EVO timing for the number of cylinders may be performed to trim turbocharger response, as discussed at FIG. 4. Thus, in this example, the desired transient EV timing is the adjusted transient EV timing. In some examples, the number of cylinders may be the total number of cylinders. That is, when trimming turbocharger response is performed, the transient EV timing may be further adjusted to obtain desired EV timing on all cylinders.

In yet another example, to achieve an initial faster response, for example, when the accelerator pedal tip-in is large, all the cylinders of the engine may be operated with an advancement in EVO timing (with or without trim), and subsequently, upon achieving the desired boost pressure and/or desired delta pressure across the engine, the number of cylinders may be reduced.

In this way, by adjusting the transient EV timing during transient conditions, faster turbocharger response is achieved.

Figure 4:
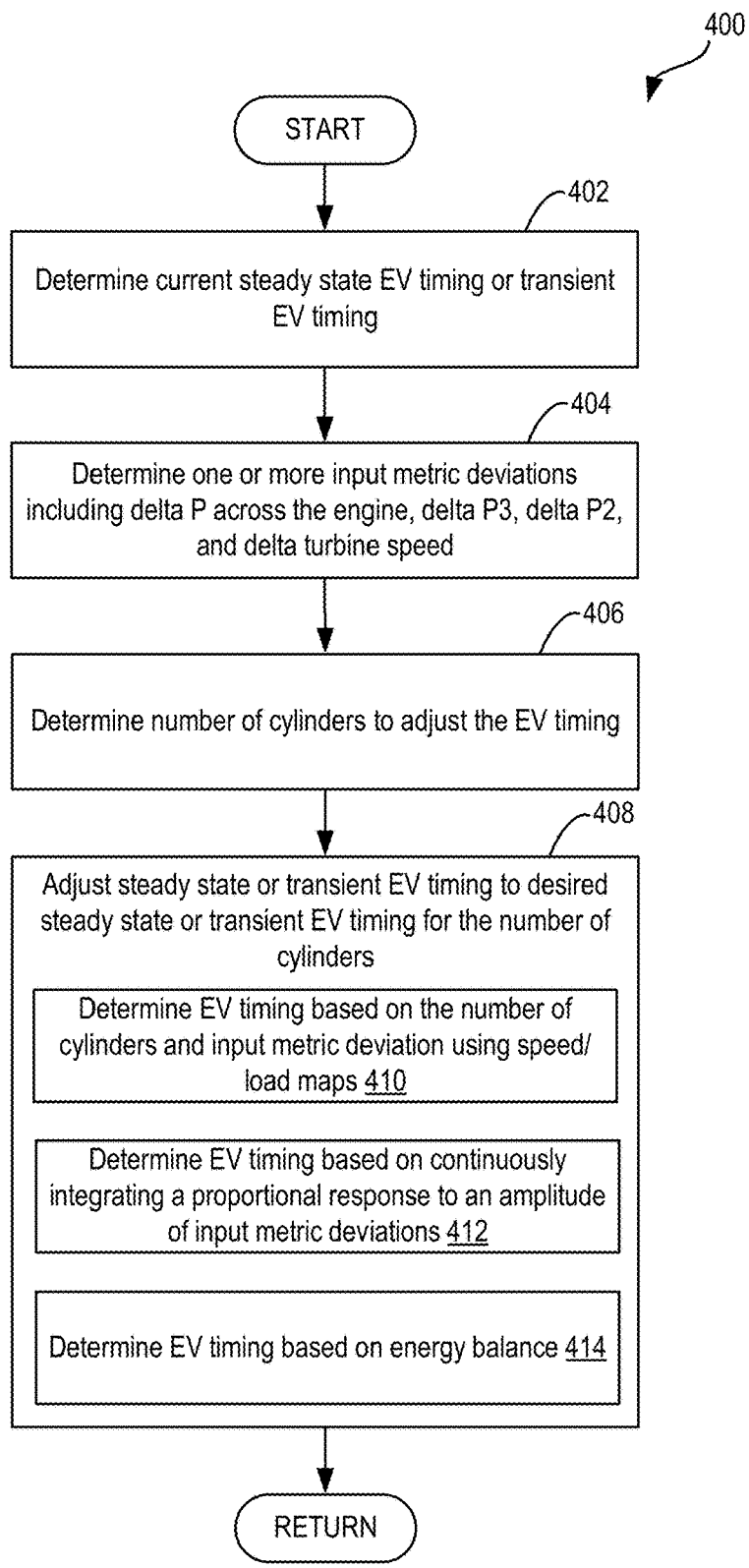
FIG. 4 shows a high level flow chart illustrating a routine that may be implemented for trimming turbocharger response.

Turning next to FIG. 4, it shows a high-level flowchart illustrating an example method 400 for trimming turbocharger response during engine operation. The method 400 may be implemented based on instructions stored in a controller, such as controller 12 at FIG. 1 or EV timing controller supervisor 606 at FIG. 6, to trim turbocharger response during engine operation. In one example, trimming turbocharger response may be performed during steady-state or quasi steady-state conditions that are based on turbocharger operating point on the compressor map. In another example, trimming turbocharger response may be performed during transient conditions after the turbocharger has been adjusted to receive increased exhaust energy and the turbocharger operation has been moved out of inefficient operation region. For example, during a transient condition, such as a medium or large accelerator pedal tip-in, the EV timing may be initially adjusted (e.g., advanced based on transient EV timing output by a transient timing controller) to bring the engine and turbocharger out of inefficient operation. When a threshold boost pressure for the transient operation has been achieved by the advancement in EV timing, the turbocharger performance may be further trimmed by the EV timing controller supervisor to further improve turbocharger performance. However, during some conditions, such as a small torque request, when the turbocharger is already in an operating region of threshold efficiency and/or is providing a threshold boost pressure for the speed/load condition trimming turbocharger performance may be continually performed.

At 402, the method 400 includes determining current steady state EV timing or transient EV timing. In one example, when the turbocharger is operating in steady state (turbocharger performance within one or more optimum efficiency islands on compressor and/or turbine maps) or quasi steady state (turbocharger performance not within the optimum efficiency island), the current steady state EV timing may be determined according to the optimized base EV timing map, as discussed at steps 222 and 218 respectively at FIG. 2. For example, the EV timing supervisor controller may determine the steady state EV timing according to the optimized base EV timing map, where the steady state EV timing is adjusted according to IMEP and/or PMEP determined according to ICPS. Further, during transient conditions, the transient EV timing may be determined by adjusting a nominal EV timing determined from the base timing map, and adjusted according to transient conditions and the desired turbocharger response, as discussed at step 210. For example, a transient EV timing controller, such as controller 632 at FIG. 6 below, may determine the transient EV timing and send it to the EV timing supervisor controller.

Next, at 404, the method 400 includes determining deviations of one or more input trim response metrics that may be used as a basis for trimming turbocharger response. The one or more input trim response metric deviations may include deviation of current delta P from a desired delta P, where delta P is measured across the engine based on difference between P3 (measured from EBP sensor) and P2 (measured from MAP sensor), deviation (delta P2) of current P2 from a desired P2, deviation (delta P3) of current P3 from a desired P3, and deviation (delta turbine speed) of current turbine speed to desired turbine speed, where turbine speed is measured based on an indication from a turbine speed sensor positioned on a coupling shaft of the turbocharger.

Next, at 408, the method 400 includes determining a number of cylinders on which the EV timing may be adjusted. For example, instead of globally moving EVO timings for all the cylinders, the number of cylinders may be selected based on operator requested torque. In one example, a number of cylinders may be less than a total number of cylinders, and although all cylinders may be operated, only the number of cylinders may be operated with change in EVO timing, while the remaining cylinders may be operated with nominal EVO timing based on optimized steady state map. In this way, depending on the operating conditions, the turbocharger as well as engine response may be trimmed to allow more or less exhaust flow to the turbine of the turbocharger. As an example, during a transient condition, such as a large or medium tip-in, initially, the number of cylinders on which the EVO timing is advanced may be the total number of cylinders in order to ensure that sufficient exhaust energy is supplied to provide desired boost and maintain a desired delta P to reduce increased opening of EGR valve. After the desired boost pressure is met during the transient, the number of cylinders on which the EVO timing is advanced may be reduced (e.g., to maintain one or more of the input metrics: delta P, delta P2, delta P3, and delta turbine speed)

Next, method 400 proceeds to 408. At 408, the method 400 includes adjusting steady state EV timing or adjusting transient EV timing for the number of cylinders. In one example, this includes further adjusting the base steady state timing (e.g., from step 222 or 218) or an initial transient EV timing (e.g., from step 210). In this example, as indicated at 410, one option is to determine EVO timing using speed/load maps and based on one or more input metric deviations. A second option is indicated at 412, wherein the EVO timing is obtained based on continuously integrating a proportional response to an amplitude of the one or more input metric deviations. At 414, a third option includes determining EVO timing based in energy balance. For example, the supervisor controller may continuously calculate exhaust energy to reach a desired set point of the one or more input metrics. Further, the controller supervisor how much available exhaust energy there is on a per valve basis as a function of crank angle to determine how much timing advance and a number of cylinder valves are needed to meet the desired set point of the one or more input metrics.

In another example, the base steady state or the initial transient EV timing may be maintained but applied only for the determined number of cylinders while the remaining number of cylinders (if the number of cylinders is less than the total number of cylinders) may be operated at nominal EVO timing that is based on optimized steady state map.

In this way, the steady state or quasit steady state or transient EVO timing may be adjusted to trim turbocharger response. For example, intake and exhaust flow dynamics may be balanced that allow different cylinders to produce more or less torque in different areas over and engine operating map, and as such, faster and more efficient turbocharger and engine operation is achieved.

Figure 5:
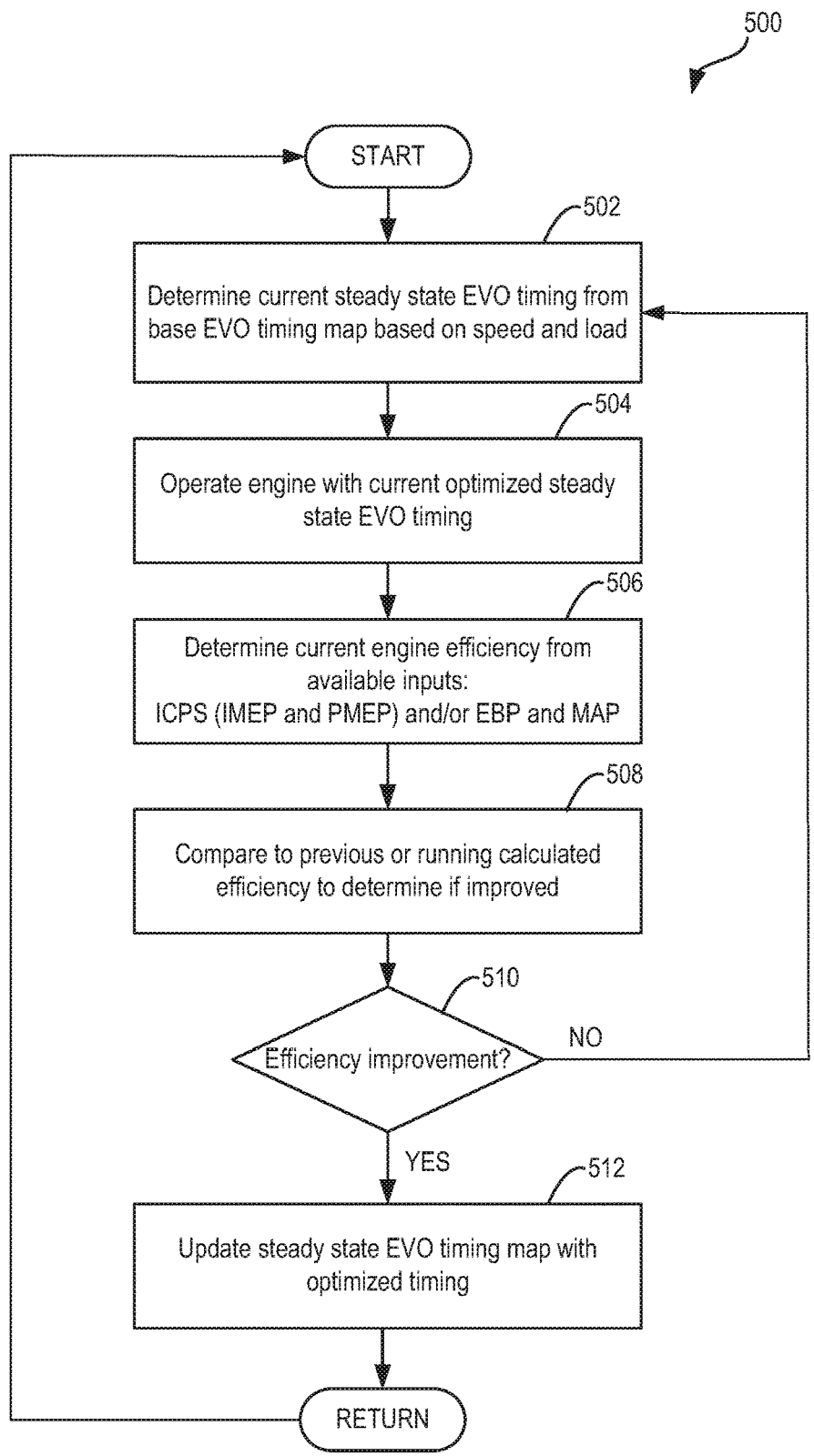
FIG. 5 shows a high level flow chart illustrating a routine that may be implemented for optimizing EV timing.

Next, FIG. 5 shows a high-level flowchart illustrating an example method 500 for optimizing nominal EV timing on the base EV timing map, particularly EVO timing. For example, as engine ages operation of various systems on the engine may shift causing the nominal location of the EV timing to shift. Some examples of engine aging include compressor fouling, EGR system fouling, and cooler fouling among various other systems. Therefore, EV timing, and in particular, EVO timing may be periodically optimized when suitable optimization conditions are met. Optimization conditions are discussed at step 204 at FIG. 2, and include very steady state conditions of turbocharger and/or engine operation, or engine and/or turbocharger operating in pre-determined regions of high confidence on the engine efficiency map and/or compressor and/or turbine maps. The method 500 may be performed based on executable instructions stored in a non-transitory memory of a controller, such as controller 12 at FIG. 1 or timing optimization controller 640 at FIG. 6 below.

At 502, the method 500 includes determining a current steady state EVO timing from a base EVO timing map. In particular, the base EVO timing map may provide a nominal EVO timing reference (which is the current steady state EVO timing during optimization conditions) according to a current engine speed and a current engine load. Said another way, the base EVO timing map is a steady state EVO timing map according to which the current steady state EVO timing is determined.

Next, at 504, the method 500 includes operating the engine with a current adjusted steady state EVO timing. The current adjusted steady state EVO timing may be an optimized steady state EVO timing, where the optimized EVO timing is targeted to improve (that is, increase) engine efficiency. In one example, the current adjusted steady state EVO timing may be retarded or advanced from the current steady state EVO timing, and the directionality of adjustment (advancement or retard) may be based on a previous engine efficiency or a running calculation of engine efficiency so as to optimize engine efficiency.

At 506, the method includes determining a current engine efficiency for the current adjusted steady state EVO timing (that is, the current optimized EVO timing) from one or more optimization input parameters. The optimization input parameters may include PMEP and IMEP, and/or EBP, and MAP. In one example, PMEP and IMEP may be determined based on indications from an ICPS sensor. For example, the ICPS sensor may provide real time feedback on current engine efficiency by continuous calculation of cycle IMEP and PMEP. In some examples, feedback from EBP and MAP sensors may be used to determine the current engine efficiency.

Next, at 508, the method 500 includes comparing the current engine efficiency with a previous filtered engine efficiency or running calculated efficiency to determine if the engine efficiency is increased with the current adjusted EVO timing. In one example, a hysteresis level may be employed to determine if the current adjusted EVO timing is good enough within a defined hysteresis range where no action is taken or outside of that where action (that is, further adjustment of EVO timing) is requested. It will be appreciated that the optimization process for steady state EVO timing is iterative by employing the comparison of the current efficiency (e.g., current filtered efficiency) to a previous (e.g., previous filtered efficiency) or a running calculation of engine efficiency to determine if the current adjusted EVO timing has increased engine efficiency or not.

Next, at 510, the method 500 includes determining if the current engine efficiency is increased from the previous efficiency. The previous efficiency and the current efficiencies may be filtered. Accordingly, the method may include determining if the current filtered engine efficiency is greater than the previous filtered efficiency by a threshold degree of efficiency. In one example, the previous and the current efficiencies may be low-pass filtered. If YES, the method 500 proceeds to 512 to update the steady state EVO timing map (that is, the base EVO timing map) with the adjusted EVO timing at which engine efficiency increase was determined. The method then returns. The optimization may continue iteratively until optimization conditions exist for engine operation.

If the answer at 510 is NO, the method 500 proceeds to step 502 without updating the steady state EVO timing. The EVO timing may be adjusted again and the engine efficiency determined according to IMEP and PMEP (via ICPS) and/or the EBP and MAP may be compared to the previous efficiency or running calculated efficiency to determine if the EVO timing map is updated or not. Next, at 506, the method 500 includes operating the engine at optimal EVO, and further, at 508, the method 500 includes updating the base EV timing map with optimal EVO timing for the current speed/load condition.

In some examples, during steady state conditions at which the optimization routine is performed, the engine may be operated over a range of steady state operating points on the operating map or at a pre-selected set of very high confidence operating points. EVO timing for those operating points may be optimized based on feedback from ICPS, EBP and/or MAP. Further, the base EV timing map may be updated with the optimized EVO timing for the range of steady state operating points or the pre-selected set of very high confidence operating points (e.g., speed and load, delta pressure across the engine (EBP-MAP), BSFC, and previous (filtered) or running calculated efficiencies).

In this way, a steady state optimum EV timing is continually updated for increased engine efficiency which serves as a basis for a nominal or steady state EV timing which is further adjusted based on desired turbocharger response and performance during various operating conditions.

FIG. 6 shows a high-level block diagram illustrating an EV timing control system 600 for adjusting EV timing for a vehicle, such as vehicle 5 at FIG. 1, including an engine, such as engine 10 at FIG. 1, and a turbocharger including a turbine, such as turbine 176 at FIG. 1, and a compressor, such as compressor at FIG. 1. Adjusting EV timing may be performed for one or more of the following: improving turbocharger response during steady state and transient vehicle operating conditions, trimming turbocharger response during steady state and transient vehicle operating conditions, and optimizing a base EV timing map to account for engine, turbocharger, and/or vehicle aging and/or fouling over a lifetime of the vehicle system.

The EV timing control system 600 includes a base EV timing map 602 that includes optimal EV timings for various engine operating points. For example, for a given engine operating speed and load condition, the base EV timing map 602 includes the corresponding optimal EV timing, where the optimal EV timing is optimal for power and efficiency balance. During optimization conditions, in one example, a timing optimization controller 640 may update the base EV timing map 602 based on a signal from an in-cylinder pressure sensor (ICPS), as shown. The ICPS provides an indication of in-cylinder pressure, which may be utilized to determine PMEP and IMEP for the engine to calculate engine efficiency, which are then utilized by the timing optimization controller 640 to determine an optimal EV timing for a current operating speed and load condition. For example, the PMEP and IMEP may be utilized to assess engine performance, and EV timing may be adjusted for the current speed and load condition to achieve desired increase in engine performance. The base EV timing map 602 may be updated with the adjusted EV timing for the current operating condition. Additionally or alternatively, the EV timing may be optimized based on desired increase in turbocharger performance. As such, the timing optimization controller 640 may receive input signals from one or more of EBP sensor, MAP sensor, Turbo Speed sensor and Air flow sensor to assess current turbocharger performance. Therefore, based on pumping work for both turbocharger and engine, performance of both the turbocharger and the engine may be assessed by the optimization controller 640, and the optimal EV timing for desired turbocharger and engine performance at the current operating conditions may be determined and updated into the base EV timing map 602. The signal output by the ICPS, and other sensors EBP, MAP, turbine speed, and MAF sensors (the sensors providing inputs to the optimization controller are indicated at block 634) may be filtered via filter 638 to isolate the desired signals for assessment of pumping work and performance of the engine and/or the turbocharger.

As discussed above with respect to FIG. 2, in order to perform EV timing optimization, the vehicle may be operating at steady state conditions, and in some examples, for a threshold optimization duration. In one example, the optimization may be performed for the vehicle when operating at pre-determined high-confidence regions. In another example, optimization may be performed by sweeping engine and/or turbocharger operation over a range of operating points, and determining corresponding optimal EV timings for the range of operating points, and updating the steady state map for those operating points.

The updated steady state map 602 provides a nominal EV timing reference 604 during steady state or quasi steady state conditions to an EV timing controller supervisor 606. The updated steady state map 602 also provides a nominal EV timing reference to a transient timing controller 632, which outputs a transient EV timing 634 during transient conditions based on inputs from EBP, MAP, turbine speed, and MAF sensors, as indicated at block 626. The determination of transient EV timing 634 is further elaborated via a control diagram representation at FIG. 7.

Turning to FIG. 7, it shows a high level block diagram illustrating an example control operation 700 that may be performed during transient operation by a transient timing controller 709 (e.g., transient timing controller 632). Map 706 is a base EV timing map, such as EV timing map 602, which may be used to determine a nominal EV timing 707 based on current operating conditions, such an engine speed 702 and operator requested torque 704. In one example, the nominal EV timing may be empirically determined and stored in a predetermined lookup tables or functions. For example, one table may correspond to determining nominal EVO timing. The table may be indexed to engine operating conditions, such as engine speed and engine load, among other engine and/or turbocharger operating conditions. Furthermore, the table may output a nominal EV timing, which may be adjusted during transient conditions as discussed below and at FIG. 3 to obtain a transient EV timing, which may input to the engine valve control system to adjust EV timing at each cylinder cycle. In some examples, the transient EV timing may be further trimmed and/or adjusted as discussed at FIG. 4 before being input to the engine valve control.

The nominal EV timing 707 may be then modified as a function of a change in desired engine torque 714 (dtrq/dt). For example, a transient state EVO map 716 may be utilized to determine an EVO timing adjustment 718 based on the change in desired engine torque 714. Further, one or more additional EVO timing adjustments 724, 730, and 736 may be determined using transient EVO timing maps 722, 728, and 734 respectively based on errors to desired input transient response metrics P3 (measured by EBP sensor), P2 (measured by MAP sensor), and turbine speed (measured by turbine speed sensor). Additional input response metrics such as mass air flow (measured by MAF sensor) may be utilized. A transient EVO timing may then be determined as a function of the change in desired torque and differences between one or more current input transient response metrics (e.g., P2, P3, MAF, and turbine speed) that provide an indication of turbocharger performance and the desired set points for the respective current transient response metric. Thus, during transient conditions, such as a tip-in, the transient controller 709 may advance EVO timing as a function of the change in desired engine torque f(dtrq/dt) and turbocharger input errors to desired input response metric (P3 (EBP), P2 (MAP), turbine speed, etc.) to increase exhaust energy and improve turbocharger response to transient (e.g., reduce turbo lag, reduce emissions, increase turbocharger efficiency). The transient EVO maps 722, 728, 734, based on delta to set point are pre-determined empirically and stored. The short term energy provided to get up to desired boost may not be directionally correct for the engine efficiency short term, but long term by shortening the start of the maneuver to reduce the time in the worst operating conditions during transient provides overall increased efficiency and performance for the whole maneuver.

As shown below, $$\text{EVO timing advance} = f(dtrq/dt)*d(P3des-P3), f(dtrq/dt)*d(ntdes-nt), f(dtrq/dt)*d(P2des-P2), \text{and/or } f(dtrq/dt)*d(MAFfdes-MAF)$$

In this way, the transient timing controller 709 may determine a proportional adjustment of the nominal EVO timing corresponding to one or more errors of one or more input response metrics to respective desired set points, and output a transient EV timing signal 634 to the EV timing controller supervisor 606, discussed at FIG. 6.

Returning to FIG. 6, during transient conditions, the EV timing controller supervisor 606 may receive the transient EV timing input 634 from the transient timing controller 632. In one example, the EV timing controller supervisor 606 may generate a desired EV timing 608, which may be a desired transient EV timing during transient conditions. For example, the desired transient EV timing may be determined for a number of cylinders on which the EV timing may be adjusted, and based on the errors in one or more input trim response metrics (e.g., delta P across engine, P3, P2, MAF, and turbine speed) as discussed at FIG. 4.

During steady state (e.g., when turbocharger meets the performance requirements) or quasi steady state condition (e.g., when turbocharger does not meet the performance requirement), the EV timing controller supervisor may receive a nominal steady state EV timing from the steady state map 602, and determine a desired steady state EV timing for a number of cylinders on which EV timing may be adjusted and based on errors in the one or more trim response metrics as discussed at FIG. 4.

The desired EV timing 608 (whether steady state or transient or nominal), may then be input to a PID controller, which generates a signal based on an error 610 between desired EV timing 608 and measured/modelled EV timing based on real-time feedback of cylinder pressure (Pcyl) 622 from ICPS. In one embodiment, the ICPS is used to measure actual exhaust valve opening timing in-lieu of a VVL position sensor. In particular, EVO events in the cylinder pressure traces as a function of crank angle. Therefore, cylinder pressure signal from ICPS may be used to monitor EVO timing.

In some examples, the ICPS sensor in addition to providing the actual EVO timing, may provide real time feedback on engine efficiency which may be obtained by continuous calculation of cycle IMEP and PMEP using ICPS. The desired EV timing may be further adjusted to moving EVO to optimize engine efficiency. In this way, EVO timing is optimized for turbocharger performance, as well as the steady state timing for best engine operation if turbocharger performance requirements are met.

The signal based on error 610 is then input to an exhaust valve actuation device 614 which is coupled to the engine valve system 616 to adjust exhaust valve opening timing. Engine response and/or sensor response 618 to EV timing adjustment is monitored via sensors indicated at 620, 626, and 634, among other sensors and fed back to timing optimization controller 640, transient timing controller 632, and EV timing controller supervisor 606.

Turning next to FIG. 8, map 800 depicts an example exhaust valve opening (EVO) timing adjustment that may be used to improve turbocharger and engine response during vehicle operating condition, including transient and steady state operating conditions.

Map 800 depicts pedal position at plot 802 and pedal depression by an operator increases in the direction of Y-axis arrow. Plot 804 depicts changes to delta P (that is, difference between exhaust back pressure P3 (measured by an EBP sensor, such as EBP sensor 128) and manifold absolute pressure P2 (measured by a MAP sensor, such as MAP sensor 122) across the engine), and delta P increases in the direction of Y-axis arrow. Plot 806 depicts changes to delta P when EVO timing is not adjusted to improve turbocharger and/or engine response. Plot 808 shows status of turbocharger response trimming that may be performed during certain vehicle operating conditions. Plot 810 shows the change in EVO timing as adjusted based on turbocharger and/or engine performance assessments. Plot 811 shows nominal EVO timing based on engine speed and load conditions. Plot 812 shows status of optimization routine for optimization of base steady state map of EVO timing (base on engine speed and load). All plots are shown over time of engine operation, along the x-axis.

Prior to t1, the engine may be operating in steady state conditions (speed and load) and the turbocharger may be meeting desired boost requirements and operating in desired efficiency islands on the turbine and compressor map. As discussed above, turbocharger performance may be monitored by using sensor inputs from one or more of EBP sensor, MAP sensor, MAF sensor, and turbine speed sensor, and determining a current operating efficiency of the turbocharger and determining if the turbocharger is operating within desired efficiency islands on the turbine and compressor maps. Accordingly, the optimization routine for optimizing EVO timing in the base map may be performed (that is, base map optimization is ON). Example optimization routine is discussed with respect to FIG. 5. Briefly, an EV timing optimization controller, such as timing optimization controller 640, may optimize EVO timing for current steady state engine operating conditions based on one or more optimization input parameters obtained from one or more of ICPS, EBP, MAP, MAF, and turbine speed sensors. The one or more optimization input parameters may include ICPS based PMEP, EBP and MAP based PMEP, ICPS based PMEP and IMEP, and EBP and MAP based PMEP and PthSet. PthSet may be used with respect to a diesel engine, wherein PthSet in the diesel engine is a parameter reflecting a current demanded indicated torque for the engine. PthSet may be used for comparison to IMEP for determining how well the engine is meeting performance as well as inclusion in the efficiency calculation.

Based on the optimization input parameters, the nominal EVO timing may be adjusted to achieve a desired PMEP that provides reduced BSFC. As another example, when the vehicle system has a degraded inter air cooler, it may create a restriction in the intake. In order to reduce pumping losses when there is a restriction in the intake (e.g., during steady state engine operating speed and load condition) EVO timing may be advanced, and the amount of advance may be based on an amount of restriction due to cooler fouling in the intake. In some examples, once the degraded component has been fixed or issue causing fouling has been addressed, when favorable optimization conditions are detected, optimization may be performed again to update the EVO timing. For example, since the restriction in the intake has been removed, the nominal EVO timing may be adjusted (e.g., retarded) to improve engine efficiency.

Further, during steady state operating conditions, once optimization is completed, and during determination of desired steady state EV timing, the nominal EV timing may be further adjusted to obtain a desired steady state EV timing in order to trim turbocharger response. Trimming turbocharger response may include determining a number of cylinders on which the EV timing adjustment may be performed. Details of trimming turbocharger response is described above with respect to FIG. 4. Furthermore, between t0 and t1, real time feedback from ICPS regarding current EVO timing may be utilized to determine an error to desired EVO timing and operate the EVO at the desired timing. Further still, in some examples, ICPS may be utilized to determine IMEP and PMEP, and continuously adjust the desired steady state EVO timing based on desired pumping work and efficiency of the engine.

At t1, the vehicle operator may depress the accelerator pedal to request more boost, and due to pedal depression beyond a threshold amount, a first tip-in may be confirmed. During the first tip-in, base map optimization (plot 812) may not be performed (turned OFF during transient and quasi steady-state conditions). Further, responsive to the tip-in, in order to obtain improve initial turbocharger response during the transient, a desired transient EVO timing may be determined as a function of change in desired torque and delta between desired and current response parameters (e.g., delta P3, delta P2, delta MAF, and delta turbine speed) as discussed with respect to FIG. 3 and FIG. 7. The desired transient EVO timing (plot 810) may be advanced from nominal EVO timing in order to allow more exhaust energy to the turbine and facilitate turbine spool up, thereby improving turbocharger response during the transient. Further, during the transient, due to adjusted EVO timing (that is, advanced EVO timing), delta P across the engine may not decrease excessively and a desired delta P required to deliver desired EGR may be maintained. However, when the EVO timing is not adjusted during transients, the delta pressure across the engine may decrease to close to zero (plot 806, dashed line), which may cause the EGR valve to open to a greater amount in an effort to deliver the EGR, which may cause cylinder misfires, which in turn reduces engine efficiency and turbocharger response. Further, during the transient operation, until desired torque demand and/or boost pressure is achieved, further adjustment of transient EVO timing to trim turbocharger response may not be performed (plot 808).

At t2, and between t2 and t3, the operator may release the accelerator pedal, and the engine operation may move to a quasi-steady-state, where turbocharger performance is not at one or more desired efficiency islands in a compressor map for example. As such, optimization may not be performed (plot 812). Further, turbocharger may be operating with excess exhaust energy than desired, and in order to reduce exhaust supplied to the turbocharger, the EVO timing may be slightly retarded from nominal to move the turbocharger into an efficient area on the compressor map. Further, the EVO timing may be further adjusted to trim turbocharger response. For example, a number of cylinder on which the EVO timing may be retarded may be determined based on desired reduction in exhaust energy.

At t3, a second tip-in may be detected. As shown in plot 802, the second tip-in may be less than the first tip-in, and as such, an amount of EVO timing advance (plot 810) from nominal (plot 811) during the second tip-in may be less than the first tip-in. Similar to first tip-in transient condition, advancing the EVO timing may improve turbocharger response and desired delta P to provide the necessary EGR may be maintained. Reduction in delta P when EVO timing advancement is not performed during the second tip-in is shown at plot 806.

At t4, the operator may release the accelerator pedal, and the vehicle may be operating in a quasi-steady-state, where turbocharger performance is not in one or more of the desired efficiency islands of the compressor map. For example, current boost may be less than desired. In order to improve turbocharger response, the EVO timing may be slightly advanced from nominal to increase exhaust heat to the turbocharger. Further, EVO timing may be adjusted (advanced) only on a number of cylinders to trim turbocharger performance, while the remaining number of cylinders may be operated with nominal EV timing.

At t5, the vehicle operator may depress the accelerator pedal to request more torque. In order to improve turbocharger performance, the EVO timing may be advanced to allow more exhaust energy to turbine, thereby improving turbocharger response. Further, the turbocharger response may be trimmed by adjusting EVO on a number of cylinders while a remaining number of cylinders may be operated with nominal EVO timing.

At t6 and beyond, the vehicle may operate at steady state, and the EVO timing may be operated at nominal EV timing on all cylinders. However, optimization conditions may not be met. For example, the operating speed and load may not be located within one or more high-confidence operating regions on the engine speed and load map. As such, optimization may not be performed (plot 812).

In this way, turbocharger and engine operation may be improved by adjusting EVO timing based on assessment of turbocharger and engine performance.

Technical effect of adjusting EV timing, in particular EVO timing, is faster and more efficient turbocharger response wherein a desired boost pressure is achieved at a faster rate while maintaining desired turbocharger efficiency and engine efficiency.

The disclosure also provides support for a method for operating an engine, comprising: adjusting a steady state exhaust valve (EV) timing according to an indicated mean effective pressure and/or a pump mean effective pressure as determined via an in-cylinder pressure sensor (ICPS) or a delta pressure determined via an EBP sensor and a MaP sensor respectively, adjusting a transient EV timing according to a MaP sensor output, and/or an EBP sensor output, and generating a desired EV timing according to the adjusted steady state EV timing and the adjusted transient EV timing. In a first example of the method, adjusting the steady state EV timing further comprises determining a nominal exhaust valve opening (EVO) timing according to an optimized base EV timing map and current engine operating conditions including an engine speed and an engine load, and advancing or retarding an exhaust valve opening (EVO) timing according to a current turbocharger efficiency of a turbocharger coupled to the engine and supplying compressed air to the engine, the current turbocharger efficiency determined via one or more of the EBP sensor, the MAP sensor, an ambient pressure sensor, a turbine speed sensor, and a mass air flow (MAF) sensor. In a second example of the method, optionally including the first example, the optimized base EV timing map is updated during an optimization routine at one or more selected engine operating conditions, the selected engine operating conditions including a high load and medium speed condition. In a third example of the method, optionally including the first and second examples, the method further comprises: during the optimization routine, comparing a current efficiency to a previous efficiency iteratively, and updating the optimized base EV timing map responsive to the current efficiency improved from the previous efficiency, wherein the current efficiency and the previous efficiency are determined according to corresponding outputs from the ICPS sensor and/or the EBP sensor and the MAP sensor, and wherein the previous efficiency is filtered. In a fourth example of the method, optionally including the first through third examples, adjusting the transient EV timing further comprises advancing a nominal EVO timing as a function of a change in a desired engine torque and one or more errors between current and desired values for one or more transient response parameters, the one or more transient response parameters including an exhaust back pressure determined via an EBP sensor, a manifold absolute pressure via a MAP sensor, a turbine speed via a turbine speed sensor, and a mass air flow via a MAF sensor. In a fifth example of the method, optionally including the first through fourth examples, the nominal exhaust valve timing is determined according to an optimized base EV timing map and current engine operating conditions including an engine speed and an engine load. In a sixth example of the method, optionally including the first through fifth examples, generating the desired EV timing further comprises: during a first engine operating condition, when the engine is operating in a steady state or quasi steady state, determining a number of cylinders which are operated with the desired EV timing, operating the number of cylinders with the desired EV timing, and operating a remaining number of cylinders with a nominal EVO timing based on a first current engine speed and load, and during a second engine operating condition, when the engine is operating in a transient state, operating a total number of cylinders at the desired EV timing. In a seventh example of the method, optionally including the first through sixth examples, the method further comprises: during the second engine operating condition, responsive to a turbocharger meeting a desired efficiency and a desired boost pressure, the turbocharger coupled to the engine and supplying compressed air to the engine, operating a second number of cylinders with the desired EV timing while operating a second remaining number of cylinders at a second nominal EVO timing based on a second current engine speed and load. In an eighth example of the method, optionally including the first through seventh examples, the second engine operating condition is a tip-in condition. In a ninth example of the method, optionally including the first through eighth examples, the method further comprises: operating the engine with the desired EV timing by adjusting an actual EV timing to the desired EV timing, the actual EV timing determined via the ICPS sensor.

The disclosure also provides support for a method for operating a turbocharged engine, comprising: determining a current turbocharger performance of a turbocharger supplying compressed air to the turbocharged engine, adjusting a steady state EV timing or a transient EV timing according to the current turbocharger performance, determining a desired EV timing according to the adjusted steady state EV timing or the transient EV timing, and operating the turbocharged engine with the desired EV timing. In a first example of the method, adjusting the steady state EV timing includes determining a nominal EVO timing according to an optimized base EV timing map and current engine operating conditions including an engine speed and an engine load, and wherein adjusting the transient EV timing includes advancing the nominal EVO timing as a function of a change in a desired engine torque and one or more errors between current and desired values for one or more transient response parameters, the one or more transient response parameters including an exhaust back pressure determined via an EBP sensor, a manifold absolute pressure via a MAP sensor, a turbine speed via a turbine speed sensor, and a mass air flow via a MAF sensor. In a second example of the method, optionally including the first example, the optimized base EV timing map is updated during an optimization routine according to one or more of an indicated mean effective pressure and/or pump mean effective pressure as determined via one or more of an ICPS, the EBP sensor, and the MAP sensor. In a third example of the method, optionally including the first and second examples, determining the desired EV timing further comprises determining a number of cylinders to operate with the desired EV timing, the number of cylinders determined according to a desired delta pressure across the engine, and wherein operating the turbocharged engine with the desired EV timing includes operating the number of cylinders with the desired EV timing while operating a remaining number of cylinders with a nominal EV timing according to an optimized base EV timing map at a current turbocharged engine operating condition including a current speed and a current load. In a fourth example of the method, optionally including the first through third examples, operating the turbocharged engine with the desired EV timing includes determining an error between an actual EV timing determined via an ICPS sensor and the desired EV timing, and adjusting the actual EV timing to the desired EV timing. In a fifth example of the method, optionally including the first through fourth examples, the turbocharger is a fixed geometry turbocharger or a variable geometry turbocharger. In a sixth example of the method, optionally including the first through fifth examples, the current turbocharger performance is determined via one or more outputs from one or more sensors coupled to the turbocharged engine, the one or more sensors including an exhaust back pressure (EBP) sensor, manifold absolute pressure (MAP) sensor, a turbine speed sensor, and a mass air flow (MAF) sensor.

The disclosure also provides support for an engine system, comprising: an engine including an intake and an exhaust, a turbocharger including a compressor for compressing intake air and an exhaust turbine, the compressor driven by the exhaust turbine, an exhaust back pressure (EBP) sensor positioned within the exhaust between the engine and the exhaust turbine, a manifold absolute pressure (MAP) sensor and a mass air flow (MAF) sensor positioned within the intake between the compressor and the engine, a turbine speed sensor coupled to a turbine shaft coupling the exhaust turbine and the compressor, a controller with computer readable instructions stored on non-transitory memory that when executed during an engine-on condition, cause the controller to: during a first condition, when the turbocharger is operating at a desired efficiency, operate the engine with a first nominal exhaust valve (EV) timing, during a second condition, when the turbocharger is not operating at the desired efficiency, determine a steady state EV timing using a second nominal EV timing and according to the desired efficiency, and operate the engine with the steady state EV timing, during a third condition, the third condition including a tip-in, determine a transient EV timing using a third nominal EV timing and according to a change in desired torque and one or more errors between current and desired values for one or more transient response parameters, the one or more transient response parameters including an exhaust back pressure determined via the EBP sensor, a manifold absolute pressure via the MaP sensor, a turbine speed via the turbine speed sensor, and a mass air flow via the MaF sensor, and operate the engine with the transient EV timing. In a first example of the system, the system further comprises: an in-cylinder pressure sensor (ICPS) positioned within each of a plurality of cylinders of the engine, and wherein the first, second, and third nominal timings are determined according to a base EV timing map that is updated during an optimization routine according to an indicated mean effective pressure and a pump mean effective pressure as determined via the ICPS and/or according to a delta pressure as determined via the EBP sensor and the MAP sensor. In a second example of the system, optionally including the first example, the transient EV timing is a transient exhaust valve opening (EVO) timing, and the third nominal EV timing is a nominal EVO timing, and wherein, during the third condition, the transient EVO timing is advanced from the nominal EVO timing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
adjusting a steady state exhaust valve (EV) timing according to an indicated mean effective pressure and/or a pump mean effective pressure as determined via an in-cylinder pressure sensor (ICPS) or a delta pressure determined via an exhaust back pressure (EBP) sensor and a manifold absolute pressure (MAP) sensor respectively;
adjusting at least one of a transient EV timing according to a MAP sensor output; and an EBP sensor output; and
generating a desired EV timing according to the adjusted steady state EV timing and the adjusted transient EV timing.

2. The method of claim 1, wherein adjusting the steady state EV timing further comprises determining a nominal exhaust valve opening (EVO) timing according to an optimized base EV timing map and current engine operating conditions including an engine speed and an engine load; and advancing or retarding an exhaust valve opening (EVO) timing according to a current turbocharger efficiency of a turbocharger coupled to the engine and supplying compressed air to the engine, the current turbocharger efficiency determined via one or more of the EBP sensor, the MAP sensor, an ambient pressure sensor, a turbine speed sensor, and a mass air flow (MAF) sensor.

3. The method of claim 2, wherein the optimized base EV timing map is updated during an optimization routine at one or more selected engine operating conditions, the selected engine operating conditions including a high load and medium speed condition.

4. The method of claim 3, further comprising: during the optimization routine, comparing a current efficiency to a previous efficiency iteratively, and updating the optimized base EV timing map responsive to the current efficiency increased from the previous efficiency; wherein the current efficiency and the previous efficiency are determined according to corresponding outputs from the ICPS sensor and/or the EBP sensor and the MAP sensor; and wherein the previous efficiency is filtered.

5. The method of claim 1, wherein adjusting the transient EV timing further comprises advancing a nominal EVO timing as a function of a change in a desired engine torque and one or more errors between current and desired values for one or more transient response parameters, the one or more transient response parameters including an exhaust back pressure determined via an EBP sensor, a manifold absolute pressure via the MAP sensor, a turbine speed via a turbine speed sensor, and a mass air flow via a MAF sensor.

6. The method of claim 5, wherein the nominal exhaust valve timing is determined according to an optimized base EV timing map and current engine operating conditions including an engine speed and an engine load.

7. The method of claim 1, wherein generating the desired EV timing further comprises: during a first engine operating condition, when the engine is operating in a steady state or quasi steady state, determining a number of cylinders which are operated with the desired EV timing, operating the number of cylinders with the desired EV timing, and operating a remaining number of cylinders with a nominal EVO timing based on a first current engine speed and load; and during a second engine operating condition, when the engine is operating in a transient state, operating a total number of cylinders at the desired EV timing.

8. The method of claim 7, further comprising: during the second engine operating condition, responsive to a turbocharger meeting a desired efficiency and a desired boost pressure, the turbocharger coupled to the engine and supplying compressed air to the engine, operating a second number of cylinders with the desired EV timing while operating a second remaining number of cylinders at a second nominal EVO timing based on a second current engine speed and load.

9. The method of claim 7, wherein the second engine operating condition is a tip-in condition.

10. The method of claim 1, further comprising: operating the engine with the desired EV timing by adjusting an actual EV timing to the desired EV timing, the actual EV timing determined via the ICPS sensor.

11. A method for operating a turbocharged engine, comprising:
determining a current turbocharger performance of a turbocharger supplying compressed air to the turbocharged engine;
adjusting a steady state EV timing and a transient EV timing according to at least one of the current turbocharger performance;
determining a desired EV timing according to at least one of the adjusted steady state EV timing and the transient EV timing; and
operating the turbocharged engine with the desired EV timing.

12. The method of claim 11, wherein adjusting the steady state EV timing includes determining a nominal EVO timing according to an optimized base EV timing map and current engine operating conditions including an engine speed and an engine load; and wherein adjusting the transient EV timing includes advancing the nominal EVO timing as a function of a change in a desired engine torque and one or more errors between current and desired values for one or more transient response parameters, the one or more transient response parameters including an exhaust back pressure determined via an exhaust back pressure (EBP) sensor, a manifold absolute pressure via a manifold absolute pressure (MAP) sensor, a turbine speed via a turbine speed sensor, and a mass air flow via a mass air flow (MAF) sensor.

13. The method of claim 12, wherein the optimized base EV timing map is updated during an optimization routine according to one or more of an indicated mean effective pressure and/or pump mean effective pressure as determined via one or more of an ICPS, the EBP sensor, and the MAP sensor.

14. The method of claim 11, wherein determining the desired EV timing further comprises determining a number of cylinders to operate with the desired EV timing, the number of cylinders determined according to a desired delta pressure across the engine; and wherein operating the turbocharged engine with the desired EV timing includes operating the number of cylinders with the desired EV timing while operating a remaining number of cylinders with a nominal EV timing according to an optimized base EV timing map at a current turbocharged engine operating condition including a current speed and a current load.

15. The method of claim 11, wherein operating the turbocharged engine with the desired EV timing includes determining an error between an actual EV timing determined via an ICPS sensor and the desired EV timing, and adjusting the actual EV timing to the desired EV timing.

16. The method of claim 11, wherein the turbocharger is a fixed geometry turbocharger or a variable geometry turbocharger.

17. The method of claim 11, wherein the current turbocharger performance is determined via one or more outputs from one or more sensors coupled to the turbocharged engine, the one or more sensors including an EBP sensor, a MAP sensor, a turbine speed sensor, and a MAF sensor.

18. An engine system, comprising:
an engine including an intake and an exhaust;
a turbocharger including a compressor for compressing intake air and an exhaust turbine, the compressor driven by the exhaust turbine;
an exhaust back pressure (EBP) sensor positioned within the exhaust between the engine and the exhaust turbine;
a manifold absolute pressure (MAP) sensor and a mass air flow (MAF) sensor positioned within the intake between the compressor and the engine;
a turbine speed sensor coupled to a turbine shaft coupling the exhaust turbine and the compressor;
a controller with computer readable instructions stored on non-transitory memory that when executed during an engine-on condition, cause the controller to:
during a first condition, when the turbocharger is operating at a desired efficiency, operate the engine with a first nominal exhaust valve (EV) timing;
during a second condition, when the turbocharger is not operating at the desired efficiency, determine a steady state EV timing using a second nominal EV timing and according to the desired efficiency, and operate the engine with the steady state EV timing;
during a third condition, the third condition including a tip-in, determine a transient EV timing using a third nominal EV timing and according to a change in desired torque and one or more errors between current and desired values for one or more transient response parameters, the one or more transient response parameters including an exhaust back pressure determined via the EBP sensor, a manifold absolute pressure via the MAP sensor, a turbine speed via the turbine speed sensor, and a mass air flow via the MAF sensor, and operate the engine with the transient EV timing.

19. The system of claim 18 further comprising an in-cylinder pressure sensor (ICPS) positioned within each of a plurality of cylinders of the engine; and wherein the first, second, and third nominal timings are determined according to a base EV timing map that is updated during an optimization routine according to an indicated mean effective pressure and a pump mean effective pressure as determined via the ICPS and/or according to a delta pressure as determined via the EBP sensor and the MAP sensor.

20. The system of claim 18, wherein the transient EV timing is a transient exhaust valve opening (EVO) timing, and the third nominal EV timing is a nominal EVO timing, and wherein, during the third condition, the transient EVO timing is advanced from the nominal EVO timing.

\* \* \* \* \*